US012570021B2

(12) United States Patent
Torrenga et al.

(10) Patent No.: US 12,570,021 B2
(45) Date of Patent: Mar. 10, 2026

(54) DRIVE ASSEMBLY FOR A FOOD PRODUCT SLICING APPARATUS

(71) Applicant: Provisur Technologies, Inc., Chicago, IL (US)

(72) Inventors: Ryan Michael Torrenga, Bourbonnais, IL (US); Michael Scott Severns, Naperville, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 618 days.

(21) Appl. No.: 18/049,009

(22) Filed: Oct. 24, 2022

(65) Prior Publication Data

US 2023/0129471 A1 Apr. 27, 2023

Related U.S. Application Data

(60) Provisional application No. 63/271,459, filed on Oct. 25, 2021.

(51) Int. Cl.
*B26D 7/26* (2006.01)
*B26D 1/00* (2006.01)
(Continued)

(52) U.S. Cl.
CPC ......... *B26D 7/2614* (2013.01); *B26D 1/0006* (2013.01); *B26D 1/06* (2013.01);
(Continued)

(58) Field of Classification Search
CPC .......... B26D 7/01; B26D 7/0625; B26D 7/32; B26D 1/28; B26D 2001/0046;
(Continued)

(56) References Cited

U.S. PATENT DOCUMENTS 2,036,012 A 3/1936 Bellinghausen
2,347,818 A 5/1944 Joseph
(Continued)

FOREIGN PATENT DOCUMENTS

AU 200111314 A1 5/2001
AU 2013202066 A1 10/2013
(Continued)

OTHER PUBLICATIONS

DE_3544708_A1 (Year: 1987).*
(Continued)

*Primary Examiner* — Jonathan G Riley

(74) *Attorney, Agent, or Firm* — Klintworth & Rozenblat LLP

(57) ABSTRACT

A drive assembly for a food product slicing apparatus is provided which slices food products into slices. The drive assembly is mounted on a frame of the food product slicing apparatus and includes lower and upper conveyor assemblies coupled to the frame which move food products relative to the frame. The upper conveyor assembly is configured to move upward and downward relative to an upper plane defined by the lower conveyor assembly, and is further configured to pivot relative to the lower conveyor assembly to firmly grip the food products as they pass therebetween.

23 Claims, 20 Drawing Sheets

(51) Int. Cl.
*B26D 1/06* (2006.01)
*B26D 1/28* (2006.01)
*B26D 5/00* (2006.01)
*B26D 5/22* (2006.01)
*B26D 5/42* (2006.01)
*B26D 7/00* (2006.01)
*B26D 7/01* (2006.01)
*B26D 7/06* (2006.01)
*B26D 7/32* (2006.01)

(52) U.S. Cl.
CPC ............... *B26D 5/007* (2013.01); *B26D 5/22* (2013.01); *B26D 5/42* (2013.01); *B26D 7/01* (2013.01); *B26D 7/0608* (2013.01); *B26D 7/0625* (2013.01); *B26D 7/0633* (2013.01); *B26D 7/0641* (2013.01); *B26D 7/32* (2013.01); *B26D 2001/0013* (2013.01); *B26D 2001/0046* (2013.01); *B26D 1/28* (2013.01); *B26D 2007/0018* (2013.01); *B26D 2210/02* (2013.01)

(58) Field of Classification Search
CPC ........ B26D 2007/0018; B26D 2210/02; B26D 5/00; B26D 7/0683; B26D 7/27; B26D 7/2635; B26D 3/22; Y10T 83/6476; B65G 15/14; B65G 21/14
See application file for complete search history.

(56) References Cited

U.S. PATENT DOCUMENTS 2,714,574 A 8/1955 Kearney
3,080,784 A 3/1963 Max
3,105,433 A 10/1963 Yerex et al.
3,179,039 A 4/1965 Christensen
3,667,521 A 6/1972 Beasley
3,842,260 A 10/1974 Christensen et al.
3,846,958 A 11/1974 Divan
3,892,156 A 7/1975 Johnstone
3,894,457 A 7/1975 Miller et al.
3,901,140 A 8/1975 Dohm, Jr.
3,982,299 A 9/1976 Kompan
3,990,336 A 11/1976 Soodalter
4,119,004 A 10/1978 Ludwig
4,179,985 A 12/1979 Baker et al.
4,196,561 A 4/1980 Kruse
4,557,019 A 12/1985 Van Devanter et al.
4,651,384 A 3/1987 Korhonen
4,815,919 A * 3/1989 Juravic .................. B65G 15/42 414/403
4,962,568 A 10/1990 Rudy et al.
4,967,652 A 11/1990 Mally
5,048,719 A 9/1991 Empl et al.
5,054,345 A 10/1991 Weber
5,056,648 A 10/1991 Huber et al.
5,064,667 A 11/1991 Mally
5,117,717 A 6/1992 Mally
5,146,827 A 9/1992 Komatsu et al.
5,152,208 A 10/1992 Ruetschle et al.
5,186,090 A 2/1993 Bunch, Jr.
5,201,259 A 4/1993 Covert et al.
5,241,887 A 9/1993 Wolff et al.
5,249,491 A 10/1993 Carter
5,267,168 A 11/1993 Antonissen et al.
5,271,304 A * 12/1993 Wygal ...................... B26D 3/22 83/425.3
5,314,375 A 5/1994 O'Brien et al.
5,324,228 A 6/1994 Vogeley, Jr.
5,334,084 A 8/1994 O'Brien et al.
5,343,791 A 9/1994 Julian et al.
5,410,954 A * 5/1995 Wygal ...................... B26D 9/00 99/538
5,423,250 A * 6/1995 Anderson ................ B26D 7/18 99/538
5,423,657 A 6/1995 Frost et al.
5,429,548 A * 7/1995 Long ...................... A22C 17/12 452/127
5,431,935 A 7/1995 Carey
5,470,274 A 11/1995 Kadi et al.
5,481,466 A 1/1996 Carey
5,482,166 A 1/1996 Brown
5,580,599 A 12/1996 Fehr
5,668,634 A 9/1997 Newman
5,720,593 A 2/1998 Pleake
5,727,997 A 3/1998 Dufour et al.
5,784,937 A 7/1998 Wygal et al.
5,832,802 A 11/1998 Warthen et al.
5,902,177 A 5/1999 Tessier et al.
5,944,598 A 8/1999 Tong et al.
5,974,925 A 11/1999 Lindee et al.
6,123,004 A 9/2000 Matz
6,129,625 A 10/2000 Cate et al.
6,186,059 B1 2/2001 Mello et al.
6,189,059 B1 2/2001 Sotek et al.
6,198,834 B1 3/2001 Belk et al.
6,253,651 B1 7/2001 Bessemer
6,407,818 B1 6/2002 Whitehouse
6,511,370 B1 1/2003 Mello et al.
6,601,499 B1 8/2003 Bifulco
6,604,991 B1 8/2003 Jurs et al.
6,606,927 B1 8/2003 Lisec
6,692,345 B1 2/2004 Kruger
6,837,030 B2 1/2005 Drebing et al.
6,859,282 B1 2/2005 Weber et al.
6,860,804 B2 3/2005 Kruger
6,882,434 B1 4/2005 Sandberg et al.
6,931,973 B2 8/2005 Kuchler
6,997,089 B2 2/2006 Lindee et al.
7,052,388 B2 5/2006 Houtz
7,055,419 B2 6/2006 Sandberg
7,156,730 B1 1/2007 Blaine
7,251,537 B1 7/2007 Blaine et al.
7,364,504 B2 4/2008 Gasbarro
7,373,217 B2 5/2008 Young
7,399,220 B2 7/2008 Kriesel et al.
7,404,759 B2 7/2008 Sato
7,450,247 B2 11/2008 Sandberg et al.
7,452,266 B2 11/2008 Bottemiller
7,500,550 B2 3/2009 Strong et al.
7,621,806 B2 11/2009 Bottemiller et al.
7,623,249 B2 11/2009 Sandberg et al.
7,651,388 B2 1/2010 Faires et al.
7,684,030 B2 3/2010 Berube et al.
7,698,977 B2 4/2010 Culling
7,715,935 B2 5/2010 Vogeley, Jr. et al.
7,747,042 B2 6/2010 Blaine
7,841,264 B2 11/2010 Kim et al.
7,918,718 B2 4/2011 Christensen et al.
7,949,414 B2 5/2011 Blaine et al.
8,016,649 B2 9/2011 Schimitzek
8,025,000 B2 9/2011 Kim et al.
8,096,860 B2 1/2012 Bolte et al.
8,109,065 B2 2/2012 Drebing et al.
8,116,554 B2 2/2012 Burton
8,166,856 B2 5/2012 Kim et al.
8,373,749 B2 2/2013 Burton
8,404,069 B2 3/2013 Douglas
8,495,938 B2 7/2013 Weber
8,517,806 B2 8/2013 Fillenworth et al.
8,529,321 B2 9/2013 Weber
8,643,851 B2 2/2014 Weber
8,651,000 B2 2/2014 Weber
8,679,565 B2 3/2014 Finkowski
8,683,903 B2 4/2014 Strong et al.
8,688,267 B2 4/2014 Blaine et al.
8,721,405 B2 5/2014 McKenna et al.
8,740,541 B2 6/2014 Pryor et al.
8,755,051 B2 6/2014 Thiedig
8,758,099 B2 6/2014 Reifenhaeuser
8,862,262 B2 10/2014 Thorsson et al.
8,869,664 B2 10/2014 Eyles et al.

(56) References Cited

U.S. PATENT DOCUMENTS 8,892,239 B2 11/2014 Weber
8,893,599 B2 11/2014 Reifenhaeuser
8,968,808 B1 3/2015 Kunert et al.
8,986,080 B2 3/2015 Black et al.
8,997,969 B2 4/2015 Plakolm
9,061,432 B2 6/2015 Reifenhaeuser
9,091,673 B2 7/2015 Fern et al.
9,095,147 B2 8/2015 Hjalmarsson et al.
9,198,442 B2 12/2015 Peters et al.
9,247,755 B1 2/2016 Andre et al.
9,272,428 B2 3/2016 Mueller et al.
9,285,213 B2 3/2016 Lindee et al.
9,351,498 B2 5/2016 Grimm et al.
9,386,780 B2 7/2016 Soncini
9,424,061 B2 8/2016 Freimuth et al.
9,427,014 B2 8/2016 Graham et al.
9,526,257 B1 12/2016 Farrant et al.
9,538,768 B2 1/2017 Dunivan
9,561,913 B2 2/2017 Briel et al.
9,597,812 B2 3/2017 Schmeiser
9,700,060 B2 7/2017 Inoue et al.
9,737,942 B2 8/2017 Nispel
9,770,838 B2 9/2017 Kim et al.
9,778,651 B2 10/2017 Strong et al.
9,828,185 B1 11/2017 Talken et al.
9,888,696 B2 2/2018 Lindee et al.
9,913,483 B2 3/2018 Vuholm et al.
9,927,377 B2 3/2018 Mills
9,962,782 B2 5/2018 Nispel
9,999,985 B2 6/2018 Middleton et al.
10,040,213 B2 8/2018 Nielsen
10,065,335 B2 9/2018 Mayer et al.
10,245,742 B2 4/2019 Foreman et al.
10,245,745 B2 4/2019 Volkl et al.
10,315,326 B2 6/2019 Achenbach et al.
10,492,504 B2 12/2019 Volkl et al.
10,493,648 B2 12/2019 Nakatsu
10,510,204 B2 12/2019 Castellano
10,538,009 B2 1/2020 Schmeiser et al.
10,654,185 B2 5/2020 Blaine et al.
10,661,466 B2 5/2020 Mayer et al.
10,682,781 B2 6/2020 Perini
10,695,931 B2 6/2020 Perini
10,695,932 B2 6/2020 Burk et al.
10,710,259 B2 7/2020 Völkl et al.
10,759,071 B2 9/2020 Chan
10,836,063 B2 11/2020 Mayer et al.
10,843,362 B2 11/2020 Grasselli
10,843,364 B2 11/2020 Volkl et al.
10,850,416 B2 12/2020 Schmeiser et al.
10,863,751 B2 12/2020 Blaine
10,869,489 B2 12/2020 Blaine et al.
10,875,207 B2 12/2020 Volkl et al.
11,009,472 B2 5/2021 Von Keudell et al.
11,014,257 B2 5/2021 Sunter et al.
11,202,452 B2 12/2021 Hofmann et al.
11,540,524 B2 1/2023 Lanzky et al.
12,227,367 B2 2/2025 Seager et al.
2001/0036807 A1 11/2001 Veldkamp et al.
2002/0004366 A1 1/2002 Thorvaldsson et al.
2003/0008608 A1 1/2003 Scalia et al.
2004/0029514 A1 2/2004 Kruger
2004/0108645 A1 6/2004 Lindelof et al.
2004/0194605 A1 10/2004 Weber
2004/0200365 A1 10/2004 Young
2004/0231526 A1 11/2004 Childress et al.
2005/0032471 A1 2/2005 Pfarr et al.
2005/0085176 A1 4/2005 Houtz
2005/0120844 A1 6/2005 Weber
2005/0188657 A1 9/2005 Drebing et al.
2005/0199111 A1 9/2005 Sandberg et al.
2006/0154587 A1 7/2006 Mikkelsen et al.
2006/0156878 A1 7/2006 Faires et al.
2006/0162515 A1 7/2006 Vogeley et al.
2006/0171581 A1 8/2006 Blaine
2006/0205335 A1 9/2006 Bifulco
2006/0219069 A1 10/2006 Skaar et al.
2007/0028742 A1 2/2007 Mueller et al.
2007/0193425 A1 8/2007 Weber
2007/0202229 A1 8/2007 Nielsen
2007/0264397 A1 11/2007 Mather et al.
2008/0016999 A1 1/2008 Mathues et al.
2008/0200107 A1 8/2008 Christensen et al.
2008/0212842 A1 9/2008 Burton
2008/0281461 A1 11/2008 Blaine et al.
2009/0035434 A1 2/2009 Sverrisson et al.
2009/0038455 A1 2/2009 Strong et al.
2009/0064833 A1 3/2009 Sandberg et al.
2009/0120256 A1 5/2009 Pasek
2009/0137195 A1 5/2009 Bottemiller et al.
2009/0246333 A1 10/2009 Groneberg et al.
2009/0294246 A1 * 12/2009 Pogue .................... B65G 67/08 198/313
2010/0066824 A1 3/2010 Burton
2010/0116107 A1 5/2010 Spillner et al.
2010/0170373 A1 7/2010 Green
2010/0179684 A1 7/2010 Blaine et al.
2010/0267320 A1 10/2010 Weber
2010/0304652 A1 12/2010 Bolte et al.
2010/0307303 A1 12/2010 Weber
2011/0111682 A1 5/2011 Schimitzek
2011/0126679 A1 6/2011 Weber
2011/0126680 A1 6/2011 Weber
2011/0150604 A1 6/2011 Marsh et al.
2011/0154969 A1 6/2011 Weber
2011/0179922 A1 7/2011 Weber
2011/0185865 A1 8/2011 Weber
2011/0203434 A1 8/2011 Reifenhaeuser
2011/0247466 A1 10/2011 Weber
2011/0247470 A1 10/2011 Weber
2011/0265621 A1 11/2011 Schmidt
2011/0311700 A1 12/2011 Shah et al.
2012/0018353 A1 1/2012 McKenna et al.
2012/0040597 A1 2/2012 Fern et al.
2012/0060659 A1 3/2012 Weber
2012/0073415 A1 3/2012 Maidel et al.
2012/0115406 A1 5/2012 Fillenworth et al.
2012/0137844 A1 6/2012 Weber
2012/0137845 A1 6/2012 Weber
2012/0198974 A1 8/2012 Weber
2012/0198975 A1 8/2012 Lindee
2012/0212603 A1 8/2012 Lindee et al.
2013/0068076 A1 3/2013 Schmeiser et al.
2013/0074667 A1 3/2013 Weber et al.
2013/0133490 A1 5/2013 Schmeiser et al.
2013/0260660 A1 10/2013 Reifenhaeuser
2014/0174891 A1 * 6/2014 Mayer ...................... B26D 7/32 198/804
2014/0338509 A1 11/2014 Lindee et al.
2015/0093488 A1 4/2015 Gutmann et al.
2015/0122100 A1 5/2015 Schmeiser
2015/0150272 A1 6/2015 Peters et al.
2015/0190939 A1 7/2015 Gerlach et al.
2015/0205288 A1 7/2015 Strong et al.
2015/0216192 A1 8/2015 Jacobsen et al.
2015/0290827 A1 10/2015 Evans et al.
2015/0367523 A1 12/2015 Schmeiser et al.
2016/0031110 A1 2/2016 Middleton et al.
2016/0088852 A1 3/2016 Lindee et al.
2016/0207152 A1 7/2016 Weber
2017/0035066 A1 2/2017 Hukelmann
2017/0156354 A1 6/2017 Inoue et al.
2017/0196232 A1 7/2017 Vuholm et al.
2017/0210023 A1 7/2017 Hocker et al.
2017/0210569 A1 7/2017 Dopp et al.
2017/0212506 A1 7/2017 Pfarr et al.
2017/0217044 A1 8/2017 Blaine
2017/0245509 A1 8/2017 Petersen et al.
2017/0320225 A1 11/2017 Fox et al.
2017/0368707 A1 12/2017 Keller
2018/0027848 A1 2/2018 Blaine et al.
2018/0029246 A1 2/2018 Blaine et al.
2018/0158537 A1 6/2018 Blaine
2018/0207896 A1 7/2018 Olson et al.

(56) References Cited

U.S. PATENT DOCUMENTS

| | | | |
|---|---|---|---|
| 2019/0009421 A1 | 1/2019 | Grasselli |
| 2019/0152084 A1 | 5/2019 | Schmeiser |
| 2020/0068908 A1 | 3/2020 | Blaine |
| 2020/0068909 A1 | 3/2020 | Blaine et al. |
| 2020/0108520 A1 | 4/2020 | Pryor et al. |
| 2020/0238556 A1 | 7/2020 | Blaine et al. |
| 2020/0269459 A1 | 8/2020 | Fox et al. |
| 2020/0315191 A1 | 10/2020 | Hofmann et al. |
| 2020/0338777 A1 | 10/2020 | Beliveau et al. |
| 2021/0001507 A1 | 1/2021 | Zambarda |
| 2021/0092968 A1 | 4/2021 | Blaine |
| 2021/0227840 A1 | 7/2021 | Blaine |
| 2023/0129471 A1 | 4/2023 | Torrenga et al. |
| 2023/0211517 A1 | 7/2023 | Su et al. |
| 2024/0058981 A1 | 2/2024 | Stachel |
| 2024/0399602 A1 | 12/2024 | Kamsteeg et al. |

FOREIGN PATENT DOCUMENTS

| | | | |
|---|---|---|---|
| AU | 2013301673 B2 | | 12/2016 |
| AU | 2012267912 B2 | | 12/2019 |
| CA | 2039045 A1 | | 9/1991 |
| CA | 2006994 C | | 9/1992 |
| CA | 2133953 A1 | | 11/1993 |
| CA | 1328856 C | | 4/1994 |
| CA | 2158625 A1 | | 3/1996 |
| CA | 2377198 A1 | | 9/2002 |
| CA | 2200545 C | | 1/2003 |
| CA | 2525674 A1 | | 12/2004 |
| CA | 2531621 A1 | | 6/2006 |
| CA | 2531626 A1 | | 6/2006 |
| CA | 2531857 A1 | | 6/2006 |
| CA | 2541555 A1 | | 10/2006 |
| CA | 2550972 A1 | | 12/2006 |
| CA | 2664348 A1 | | 5/2008 |
| CA | 2511654 C | | 6/2009 |
| CA | 2708216 A1 | | 6/2009 |
| CA | 2767423 A1 | | 1/2011 |
| CA | 2779326 A1 | | 5/2011 |
| CA | 3013395 A1 | | 5/2011 |
| CA | 2783818 A1 | | 6/2011 |
| CA | 2738300 A1 | | 10/2011 |
| CA | 2552307 C | | 1/2012 |
| CA | 2531852 C | | 2/2013 |
| CA | 2531863 C | | 2/2013 |
| CA | 2743418 C | | 4/2013 |
| CA | 2531895 C | | 8/2013 |
| CA | 2695808 C | | 11/2015 |
| CA | 2877448 C | | 10/2016 |
| CA | 2904958 A1 | | 3/2017 |
| CA | 2706407 C | | 5/2017 |
| CA | 2531857 C | | 10/2017 |
| CA | 3032041 A1 | | 2/2018 |
| CA | 2899291 C | | 3/2018 |
| CA | 2778724 C | | 9/2018 |
| CA | 3108061 A1 | | 3/2020 |
| CA | 3032196 C | | 10/2020 |
| CA | 3137380 A1 | | 11/2020 |
| CN | 105979784 A | | 9/2016 |
| DE | 2843388 A1 | | 6/1979 |
| DE | 8128596 U1 | | 3/1982 |
| DE | 3100901 A1 | | 8/1982 |
| DE | 3544708 A1 | * | 6/1987 |
| DE | 68903375 T2 | | 3/1993 |
| DE | 19917536 A1 | | 10/2000 |
| DE | 10220006 A1 | | 11/2003 |
| DE | 102004010696 A1 | | 9/2005 |
| DE | 60305523 T2 | | 8/2007 |
| DE | 102010011172 A1 | | 9/2011 |
| DE | 102010021951 A1 | | 12/2011 |
| DE | 102012107278 A1 | | 2/2014 |
| DE | 102016003938 A1 | | 10/2017 |
| DE | 102019110313 B3 | | 7/2020 |
| DK | 201570224 A1 | | 4/2015 |
| EP | 0101264 A2 | | 2/1984 |
| EP | 0057478 B1 | | 4/1986 |
| EP | 0332895 A2 | | 9/1989 |
| EP | 341564 A1 | | 11/1989 |
| EP | 0373844 A1 | | 6/1990 |
| EP | 0449512 A1 | | 10/1991 |
| EP | 0637278 A1 | | 2/1995 |
| EP | 587870 B1 | | 2/1996 |
| EP | 0377451 B1 | | 4/1997 |
| EP | 0690773 B1 | | 2/1998 |
| EP | 1064518 A2 | | 1/2001 |
| EP | 1174034 A1 | | 1/2002 |
| EP | 1243386 A2 | | 9/2002 |
| EP | 0971595 B1 | | 2/2003 |
| EP | 1211944 B1 | | 9/2004 |
| EP | 1429898 B1 | | 5/2005 |
| EP | 1356906 B1 | | 8/2005 |
| EP | 1626622 A2 | | 2/2006 |
| EP | 1555882 B1 | | 5/2006 |
| EP | 1782929 A2 | | 5/2007 |
| EP | 1289374 B1 | | 7/2007 |
| EP | 2084968 A1 | | 8/2009 |
| EP | 2094102 A1 | | 9/2009 |
| EP | 1781110 B1 | | 2/2010 |
| EP | 2210495 A1 | | 7/2010 |
| EP | 2230920 A2 | | 9/2010 |
| EP | 2266766 A2 | | 12/2010 |
| EP | 1178878 B2 | | 5/2011 |
| EP | 2341313 A1 | | 7/2011 |
| EP | 2352381 A2 | | 8/2011 |
| EP | 2353391 A1 | | 8/2011 |
| EP | 1583640 B1 | | 10/2011 |
| EP | 1820614 B1 | | 10/2011 |
| EP | 2258523 B1 | | 11/2011 |
| EP | 1552912 B1 | | 2/2012 |
| EP | 2190637 B1 | | 2/2012 |
| EP | 2272640 B1 | | 2/2012 |
| EP | 2452168 A1 | | 5/2012 |
| EP | 2509454 A2 | | 10/2012 |
| EP | 2450166 B1 | | 11/2012 |
| EP | 2572840 A2 | | 3/2013 |
| EP | 2572841 A2 | | 3/2013 |
| EP | 2572842 A2 | | 3/2013 |
| EP | 2625959 A2 | | 8/2013 |
| EP | 2516118 B1 | | 11/2013 |
| EP | 2664425 A2 | | 11/2013 |
| EP | 2531038 B1 | | 12/2013 |
| EP | 2644337 B1 | | 3/2014 |
| EP | 1915240 B1 | | 4/2014 |
| EP | 2029330 B1 | | 4/2014 |
| EP | 2755018 A1 | | 7/2014 |
| EP | 2618962 B1 | | 8/2014 |
| EP | 2493765 B1 | | 10/2014 |
| EP | 2809454 A1 | | 12/2014 |
| EP | 2435220 B1 | | 7/2015 |
| EP | 2537651 B1 | | 10/2015 |
| EP | 2829372 B1 | | 12/2015 |
| EP | 2341313 B1 | | 3/2016 |
| EP | 2796255 B1 | | 5/2016 |
| EP | 2835236 B1 | | 6/2016 |
| EP | 3069836 A1 | | 9/2016 |
| EP | 2359992 B2 | | 12/2016 |
| EP | 2444213 B1 | | 1/2017 |
| EP | 1534478 B1 | | 3/2017 |
| EP | 2437920 B1 | | 5/2017 |
| EP | 3170632 A1 | | 5/2017 |
| EP | 3069835 B1 | | 11/2017 |
| EP | 2315650 B1 | | 12/2017 |
| EP | 3275313 A1 | | 1/2018 |
| EP | 2439029 B1 | | 4/2018 |
| EP | 2882296 B1 | | 4/2018 |
| EP | 2885115 B1 | | 4/2018 |
| EP | 3160241 B1 | | 10/2018 |
| EP | 3386691 A1 | | 10/2018 |
| EP | 2494307 B1 | | 12/2018 |
| EP | 3424332 A1 | | 1/2019 |
| EP | 3483553 A1 | | 5/2019 |
| EP | 3305696 B1 | | 7/2019 |
| EP | 3224005 B1 | | 8/2019 |
| EP | 3238898 B1 | | 10/2019 |

(56) References Cited

FOREIGN PATENT DOCUMENTS

EP 2414140 B1 11/2019
EP 1782929 B2 12/2019
EP 3578917 A1 12/2019
EP 3332928 B1 1/2020
EP 3424332 B1 1/2020
EP 3392847 B1 2/2020
EP 3689563 A1 8/2020
EP 3448643 B1 9/2020
EP 3448642 B1 10/2020
EP 2895308 B1 1/2021
EP 3760368 A1 1/2021
EP 3490383 B1 5/2021
EP 3174666 B1 7/2021
EP 3843549 A1 7/2021
EP 3386692 B1 9/2021
EP 3888864 A1 10/2021
EP 3900899 A1 10/2021
EP 2844440 B2 11/2021
EP 3448641 B1 9/2022
FR 2737479 A1 * 2/1997 ........... B26D 7/0625
GB 483604 A 4/1938
GB 2075459 A 11/1981
GB 2364894 A 2/2002
GB 2377362 A 1/2003
GB 2364894 A8 7/2010
JP 2007522948 A 8/2007
JP 5025271 B2 9/2012
KR 20100101880 A 9/2010
KR 101025501 B1 4/2011
KR 20190005814 A 1/2019
KR 102018637 B1 9/2019
MX 2017003541 A 10/2017
WO WO9322114 A1 11/1993
WO WO9947885 A2 9/1999
WO WO200062983 A1 10/2000
WO WO0132369 A1 5/2001
WO WO200328963 A1 4/2003
WO WO200359585 A2 7/2003
WO WO2004105519 A2 12/2004
WO WO2004106020 A1 12/2004
WO WO2006080033 A1 8/2006
WO WO2006136814 A1 12/2006
WO WO2007022782 A2 3/2007
WO WO2007096363 A1 8/2007
WO WO2008057732 A1 5/2008
WO WO2009079173 A2 6/2009
WO WO2010054332 A2 5/2010
WO WO2011072187 A2 6/2011
WO WO2012161577 A1 11/2012
WO WO2013113518 A1 8/2013
WO WO2013135264 A1 9/2013
WO WO2013148322 A1 10/2013
WO WO2014023626 A2 2/2014
WO WO201460340 A1 4/2014
WO WO2015092935 A1 6/2015
WO WO2015114118 A1 8/2015
WO WO2015193507 A1 12/2015
WO WO2016045683 A1 3/2016
WO WO2017133972 A1 8/2017
WO WO2017186826 A1 11/2017
WO WO2018111108 A2 6/2018
WO WO2020046868 A1 3/2020
WO WO2020212246 A1 10/2020
WO WO2020225529 A1 11/2020

OTHER PUBLICATIONS

FR_2737479_A1 (Year: 1997).*
International Search Report and Written Opinion for PCT/US2022/047623 mailed dated Apr. 17, 2023, 58 pages.

* cited by examiner

DRIVE ASSEMBLY FOR A FOOD PRODUCT SLICING APPARATUS

CROSS-REFERENCE TO RELATED APPLICATION

This application claims the priority of U.S. provisional application Ser. No. 63/271,459, filed on Oct. 25, 2021, the contents of which are incorporated herein in its entirety.

FIELD OF THE DISCLOSURE

The present disclosure generally relates to a drive assembly including movable conveyor assemblies which grip a food product as the food product is being moved to a slicing assembly of a food product slicing apparatus.

BACKGROUND

Known high-speed food slicing machines use some form of conveyor assembly to feed the food product in the forward direction. Some known high-speed food slicing machine utilize a lower conveyor assembly and an upper conveyor assembly. Because food products vary in size, the upper and lower conveyor assemblies in known machines may not fully grip the food products, which may lead to misregistration at the slicing blade. This adversely impacts the dimensions of the resulting slice. Operators would appreciate improvements to the registration of the food product as it passes through the conveyor assemblies.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
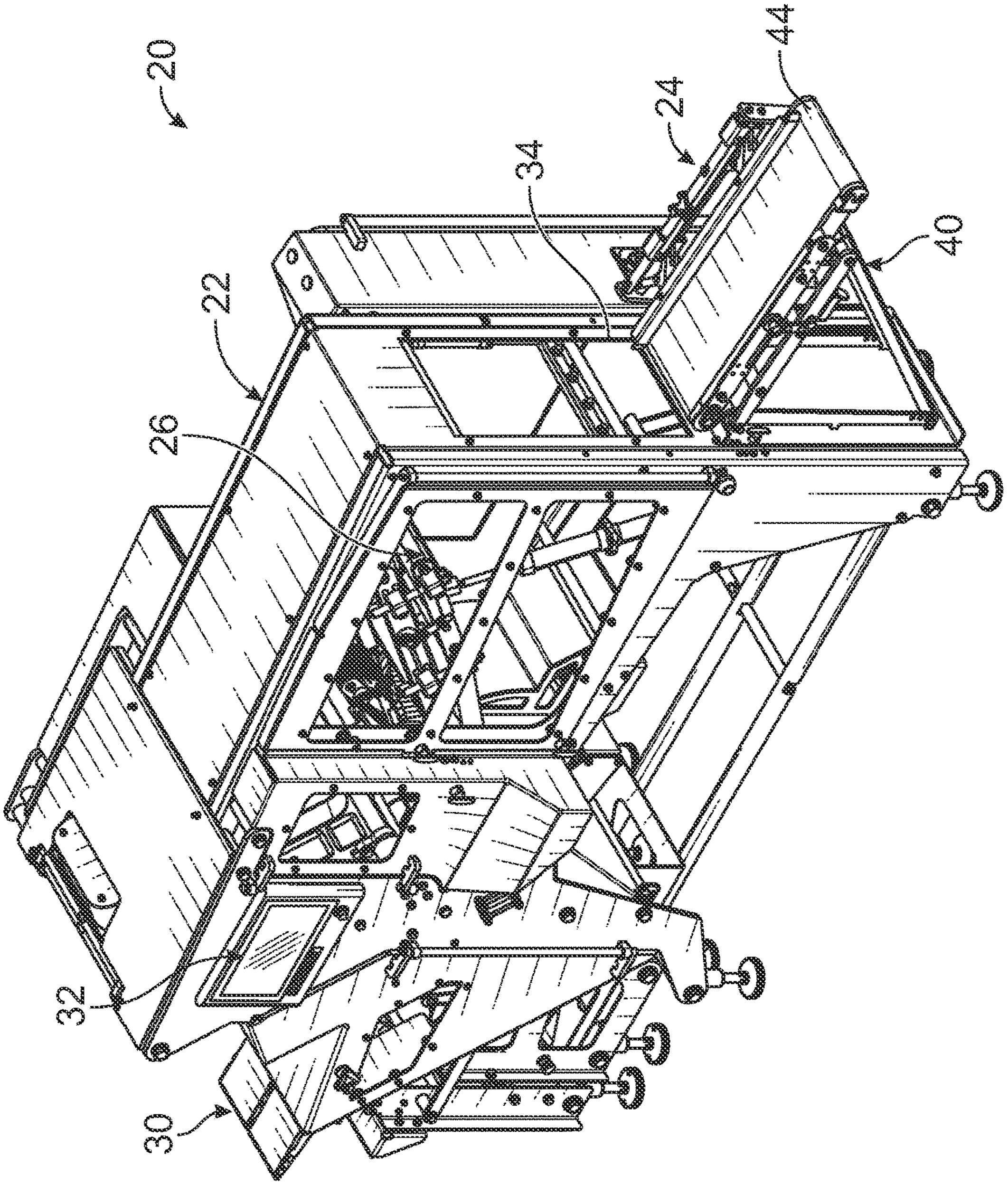
FIG. 1 depicts a rear perspective view of a food product slicing apparatus.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Food product slicing apparatuses and methods associated with the same are included in the present disclosure. With reference to the figures, one example of a food product slicing apparatus 20 is shown. The food product slicing apparatus 20 is used to slice food products into slices. The food products may be comprised of a wide variety of edible materials including, but not limited to meat, such as pork bellies, beef, chicken, fish, etc., and cheese.

Figure 2:
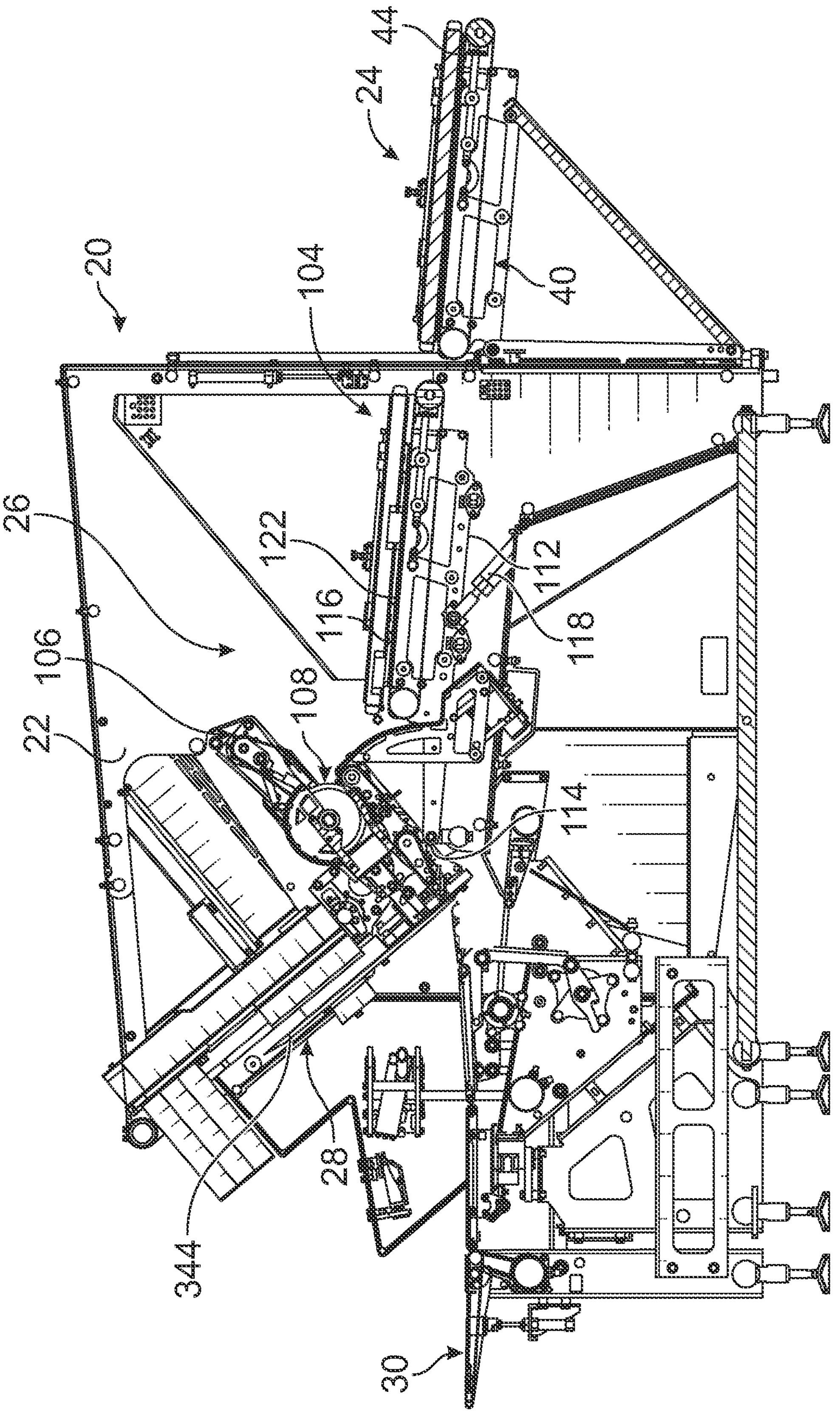
FIG. 2 depicts a cross-sectional view of the food product slicing apparatus with a loading tray assembly of a feed assembly of the food product slicing apparatus in a lowered position.
Figure 3:
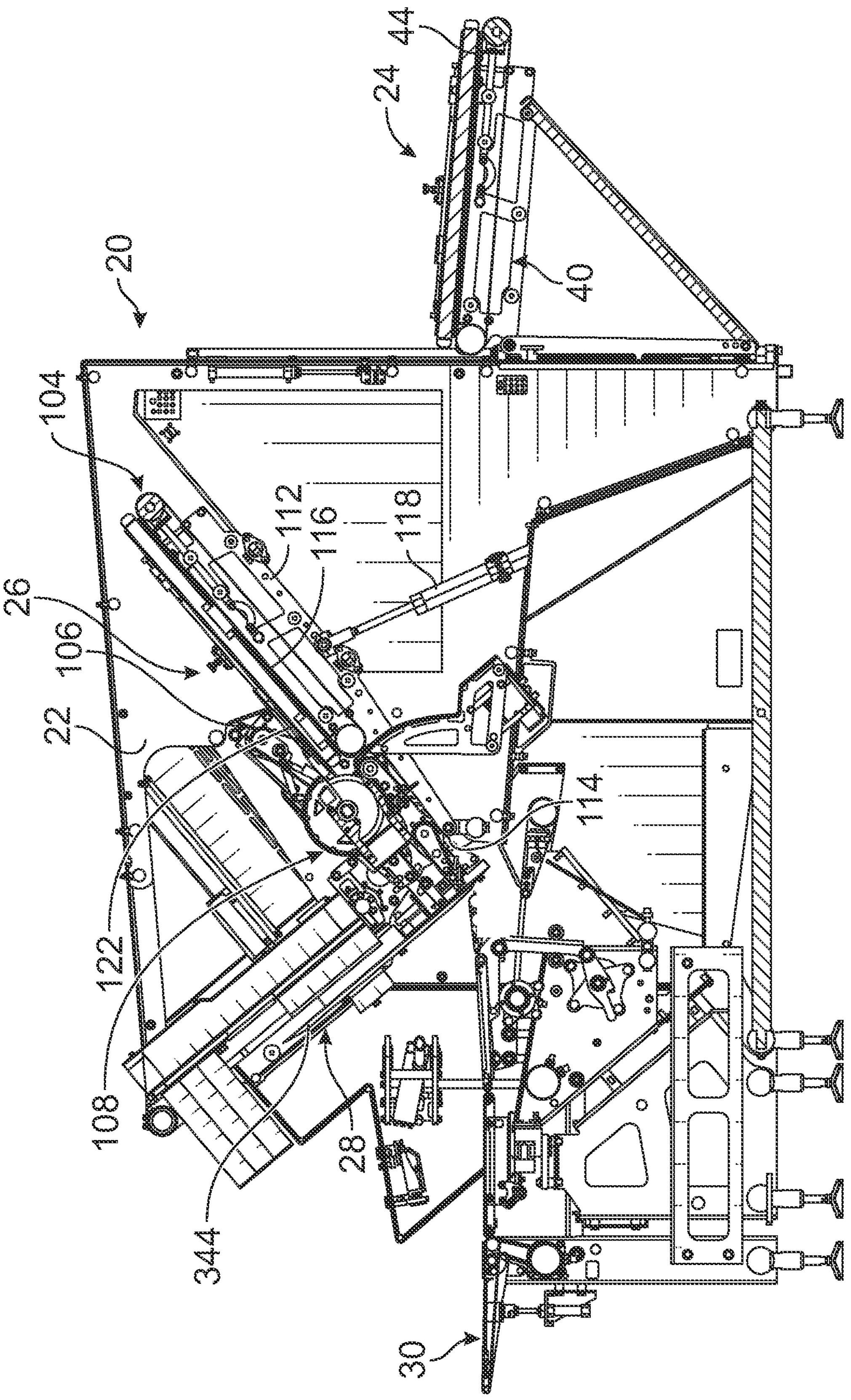
FIG. 3 depicts a cross-sectional view of the food product slicing apparatus with the loading tray assembly in a raised position.

As generally shown in FIGS. 1-3, the food product slicing apparatus 20 includes a main frame 22, a load assembly 24 mounted on the main frame 22, a feed assembly 26 mounted on the main frame 22 forward of the load assembly 24, a slicing assembly 28 mounted on the main frame 22 forward of the feed assembly 26, and an output assembly 30 mounted on the main frame 22 forward of the slicing assembly 28. The food product slicing apparatus 20 further includes a control system 32 configured to control operation of the components of the food product slicing apparatus 20. The main frame 22 supports the load assembly 24, the feed assembly 26, the slicing assembly 28, and the output assembly 30 on a ground surface and includes various mechanisms and power systems for powering the food product slicing apparatus 20. The load assembly 24 and the feed assembly 26 are configured to support and handle the food products and to move the food products to the slicing assembly 28.

The slicing assembly 28 is configured to slice the food products into individual slices. The sliced food product is supported on the output assembly 30, which may be a conveyor, in stacks or in shingles and moved away from the slicing assembly 28. The control system 32 includes all the necessary hardware and software to perform all of the operations and functions of the food product slicing apparatus 20. The control system 32 may be mounted on the main frame 22 or may be remote from the main frame 22.

In an embodiment, and as shown, the load assembly 24 includes a loading frame 40 on which a conveyor 44 is provided. Other load assemblies 24 may be provided.

The feed assembly 26 includes a loading tray assembly 104 mounted on the main frame 22 forward of the load assembly 24, and a drive assembly 106 mounted on the main frame 22 forward of the loading tray assembly 104. The loading tray assembly 104 moves food products from the load assembly 24 to the drive assembly 106, and the drive assembly 106 moves food products to the slicing assembly 28.

As shown in FIGS. 2 and 3, the loading tray assembly 104 includes a longitudinally extending support frame 112 having a front end pivotally attached to the main frame 22 at a pivot 114, a conveyor 116 mounted on an upper side of the support frame 112, and an actuator 118 for lifting or lowering the support frame 112 and the conveyor 116. The actuator 118 may be pneumatic cylinder. The conveyor 116 includes an endless belt wrapped around a plurality of wheels, with at least one of the wheels being a drive wheel or being driven by a separate drive wheel. The endless belt defines a planar upper surface 122 upon which food products will translate. The loading tray assembly 104 is pivotable between a first, lowered position, see FIG. 2, in which the conveyor 116 is aligned with the conveyor 44 of the load assembly 2 and a second raised position, see FIG. 3, in which the conveyor 116 is aligned with the drive assembly 106.

As shown in FIGS. 4-9, the drive assembly 106 includes a drive frame support plate 126 fixedly coupled to, and cantilevered from, the main frame 22, an upper drive assembly 130 cantilevered from the drive frame support plate 126, a lower drive assembly 132 cantilevered from the drive frame support plate 126, and a motor assembly 134 coupled to the drive frame support plate 126 and to the upper and lower drive assemblies 130, 132. The drive frame support plate 126 extends parallel to the longitudinal axis of the food product slicing apparatus 20.

The upper drive assembly 130 includes a first support plate 136 on one side of the drive frame support plate 126 and extending parallel thereto, a second support plate 244 on the opposite side of the drive frame support plate 126 and extending parallel thereto, a rear shaft 138 extending through the support plate 136 and the drive frame support plate 126 and coupled to the motor assembly 134, a rear conveyor assembly 140 mounted on the rear shaft 138, a front shaft 142 extending through the support plate 136 and the drive frame support plate 126 and coupled to the motor assembly 134, and a front conveyor assembly 144 mounted on the front shaft 142. The rear and front conveyor assemblies 140, 144 are separated from each other by an upper gap 240. The rear shaft 138 extends through a bearing 146 mounted in the drive frame support plate 126 and the support plates 136, 244 to allow rotation of the rear shaft 138 relative to the drive frame support plate 126 and the support plates 136, 244. The front shaft 142 extends through a bearing 148 mounted in the support plates 136, 244 and through an enlarged opening 150 in the drive frame support plate 126 to allow rotation of the front shaft 142 relative to the support plates 136, 244 and movement relative to the drive frame support plate 126. The support plates 136, 244 couple the ends of the shafts 138, 142 together.

The rear conveyor assembly 140 includes an endless belt 180 wrapped around a plurality of shaft mounted wheels extending from support plate 136, including shaft 138. The endless belt 180 defines a lower surface which engages with an upper surface of the food products. The front conveyor assembly 144 includes endless belts 200, 204 wrapped around a plurality of shaft mounted wheels extending from support plate 136, including shaft 142. The endless belt defines a lower surface upon which food products will translate.

The lower drive assembly 132 includes a support plate 152 on the opposite side of the support plate 136 from the drive frame support plate 126 and extending parallel thereto, a rear shaft 154 extending through the support plate 152 and the drive frame support plate 126 and coupled to the motor assembly 134, a rear conveyor assembly 156 mounted on the rear shaft 154, a front shaft 158 extending through the support plate 152 and the drive frame support plate 126 and coupled to the motor assembly 134, and a front conveyor assembly 160 mounted on the front shaft 158. The rear and front conveyor assemblies 156, 160 are separated from each other by a lower gap 242. The rear shaft 154 extends through a bearing 162 mounted in the drive frame support plate 126 and the support plate 152 to allow rotation of the rear shaft 154 relative to the drive frame support plate 126 and to the support plate 152. The front shaft 158 extends through a bearing 164 mounted in the drive frame support plate 126 and the support plate 152 to allow rotation of the front shaft 158 relative to the drive frame support plate 126 and the support plate 152. The lower drive assembly 132 further includes a feed roller assembly 166 coupled to the front conveyor assembly 160. The bearing 146 of the rear shaft 138 of the rear conveyor assembly 140 further extends through the support plate 152.

Figure 5:
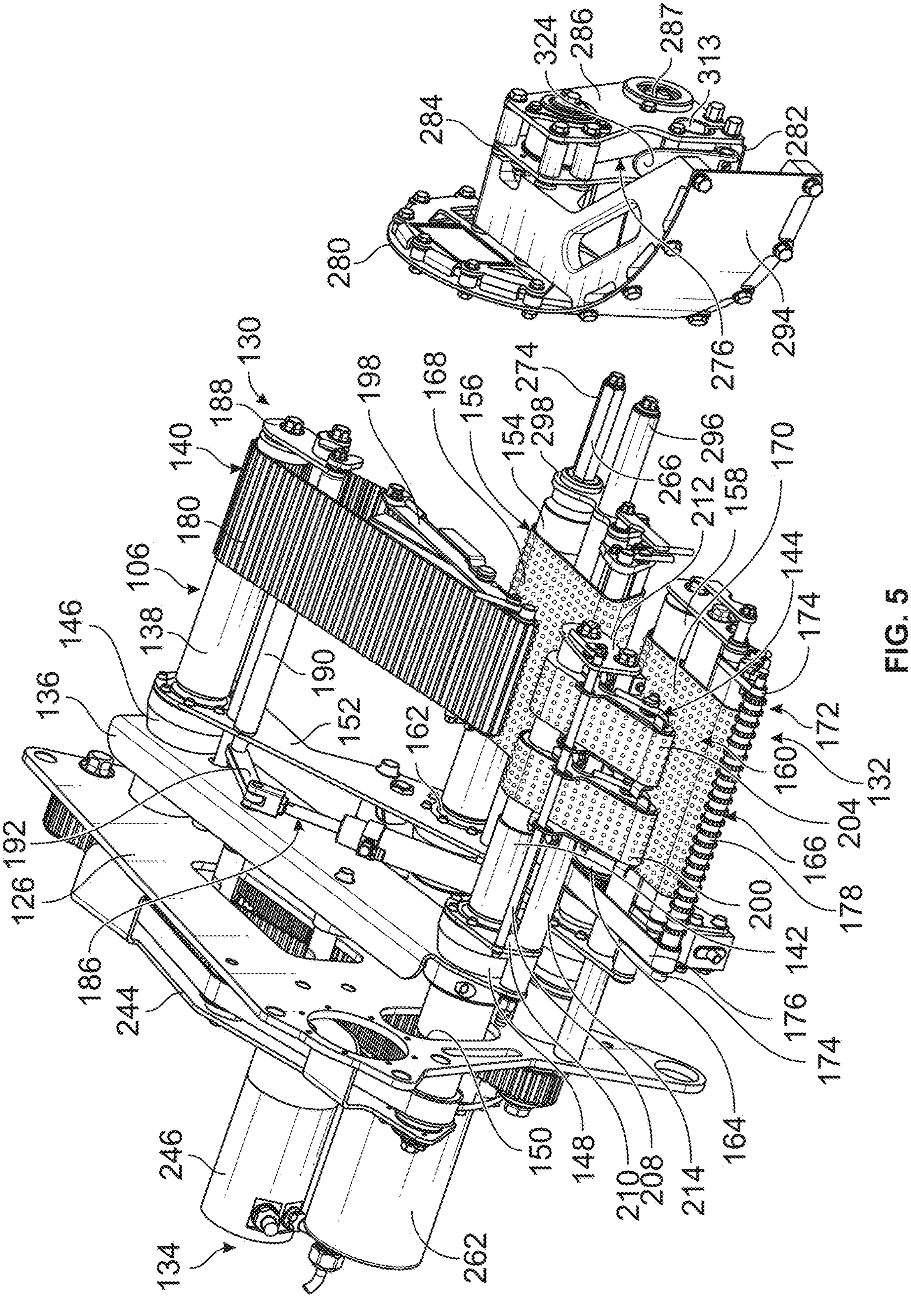
FIG. 5 depicts a front perspective view of the drive assembly with a side strapping assembly exploded therefrom.
Figure 6:
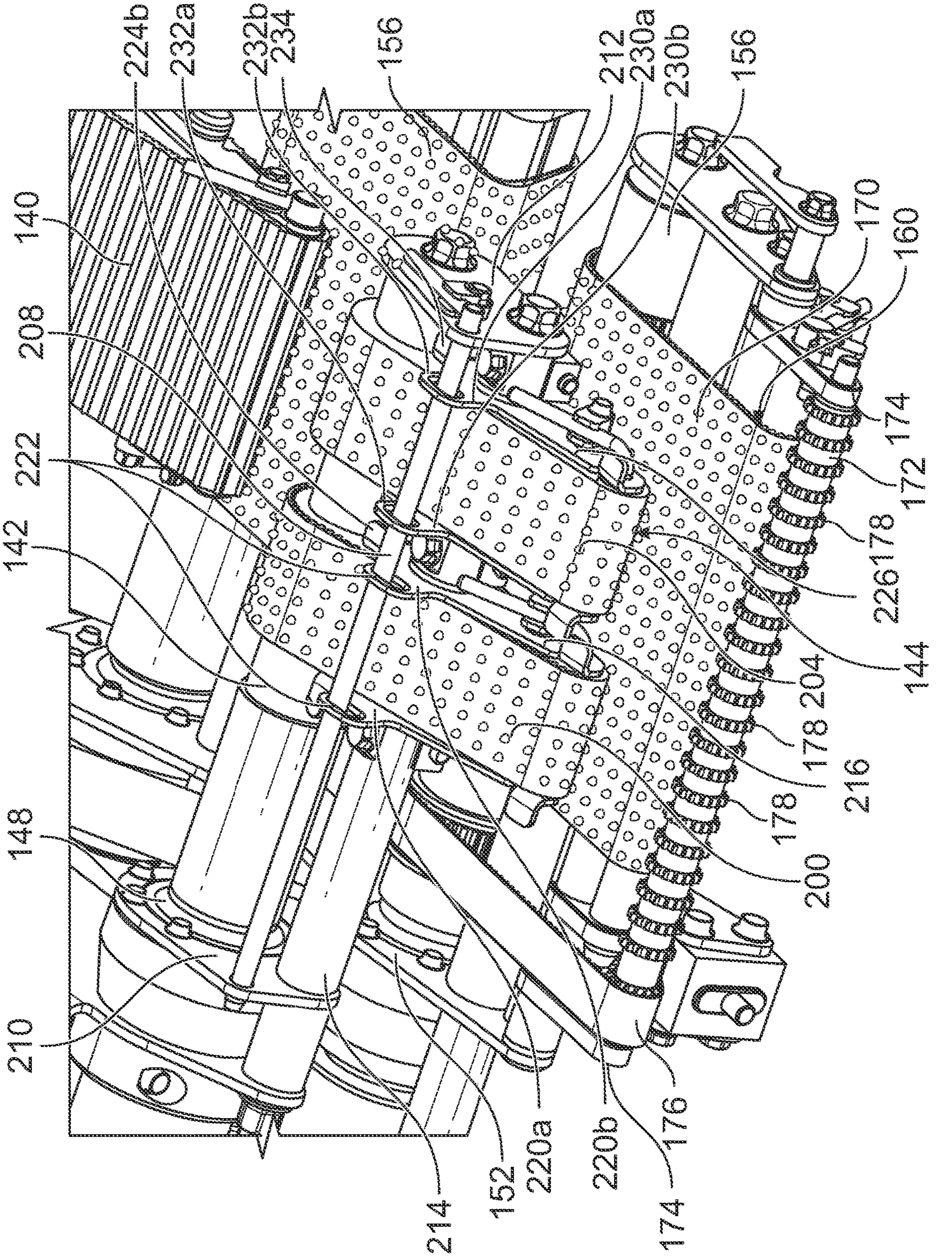
FIG. 6 depicts a front enlarged perspective view of a portion of the drive assembly.

The rear conveyor assembly 156 includes an endless belt 168 wrapped around a plurality of shaft mounted wheels extending from support plate 152, including rear shaft 154. A longitudinal axis is defined between the rear and front ends of the rear conveyor assembly 156 and the endless belt defines a planar upper surface upon which food products will translate. As shown in FIG. 5, the endless belt 180 of the rear conveyor assembly 140 may be narrower than the endless belt 168 of the lower conveyor assembly 156. The front conveyor assembly 160 includes an endless belt 170 wrapped around a plurality of shaft mounted wheels extending from support plate 152, including front shaft 158. A longitudinal axis is defined between the rear and front ends of the front conveyor assembly 160 and the endless belt 170 defines a planar upper surface upon which food products will translate. The planes defined by the planar upper surfaces of the belts 168, 170 are aligned.

Figure 17:
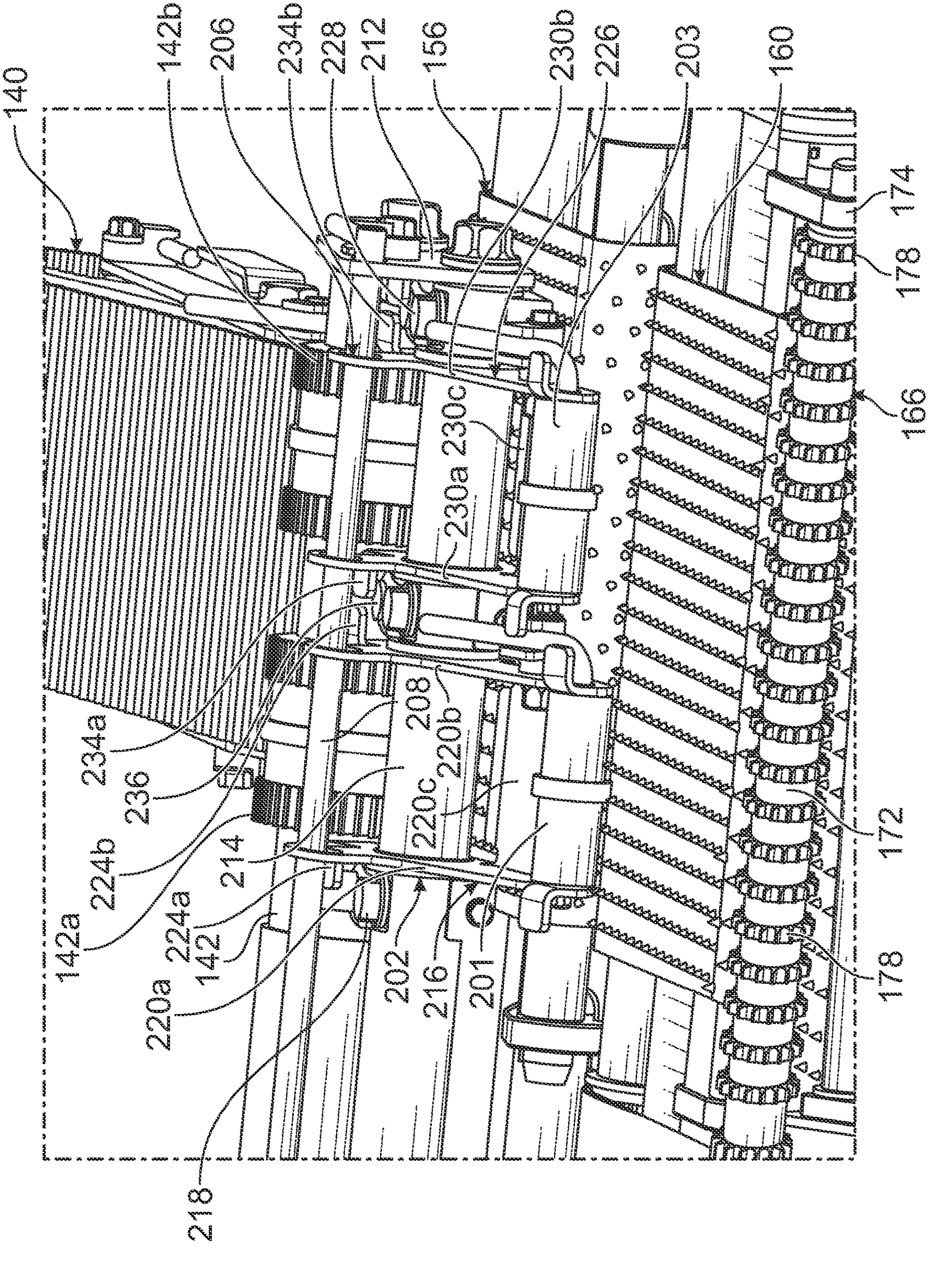
FIG. 17 depicts a front partial perspective view of the drive assembly with belts of an upper front conveyor assembly removed to show internal components.
Figure 18:
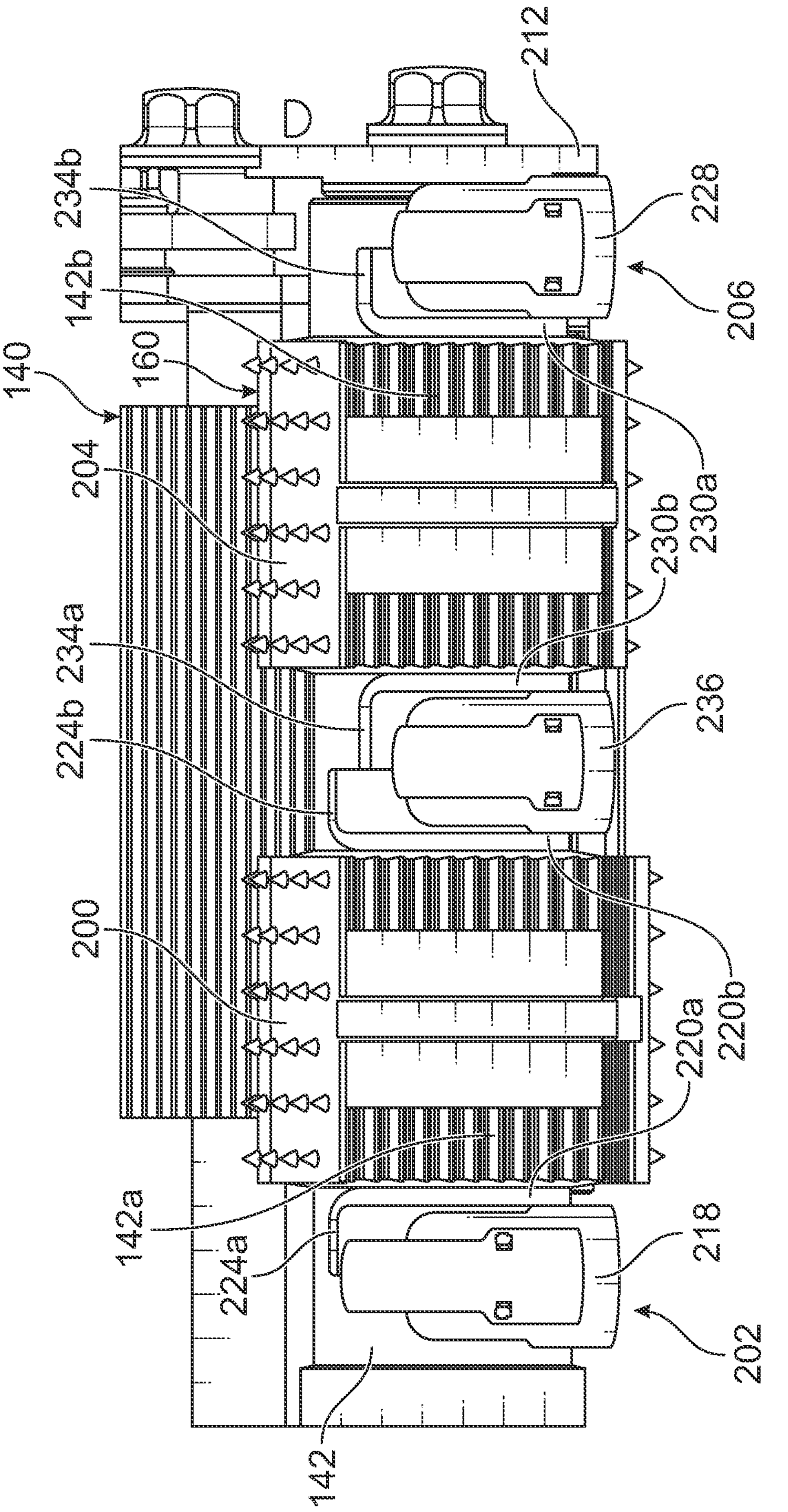
FIG. 18 depicts a cross-sectional view of the drive assembly.
Figure 19:
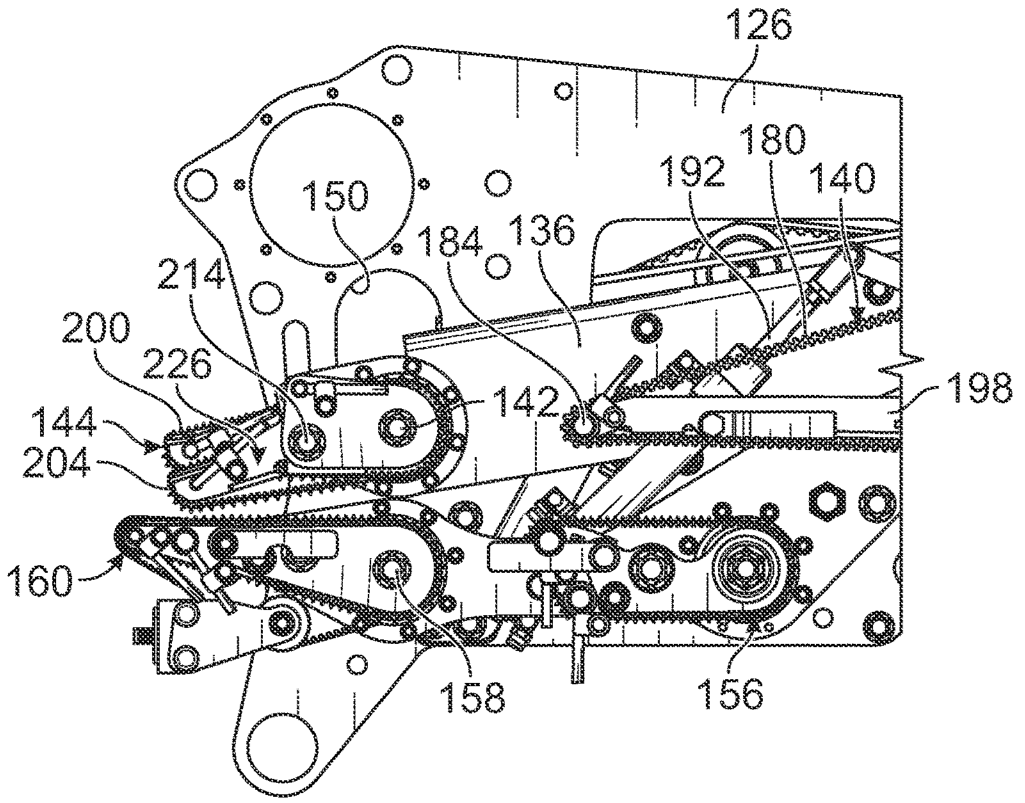
FIGS. 19 and 20 depict partial cross-sectional view of the drive assembly showing the upper front conveyor assembly in pivoted positions.

As a result of this structure, support plates 136, 244 can pivot around rear shaft 138 relative to the drive frame support plate 126. The shaft 142 pivots along an arc with the support plates 136, 244 along the length of the enlarged opening 150 as shown in FIGS. 17-19. This moves the front conveyor assembly 144 upwardly and downwardly relative to the front conveyor assembly 160 to vary the distance between the conveyor assemblies 144, 160. The support plate 152 is fixed in position relative to the drive frame support plate 126.

Figure 8:
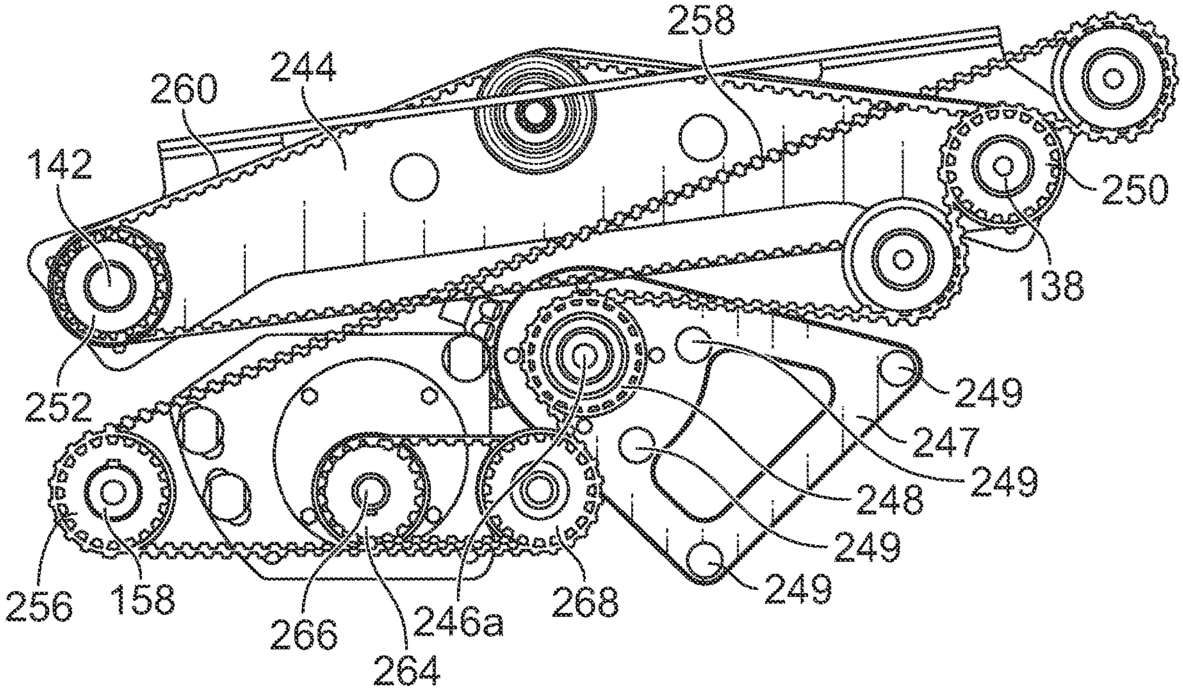
FIGS. 8 and 9 depict cross-sectional views of the drive assembly.
Figure 9:
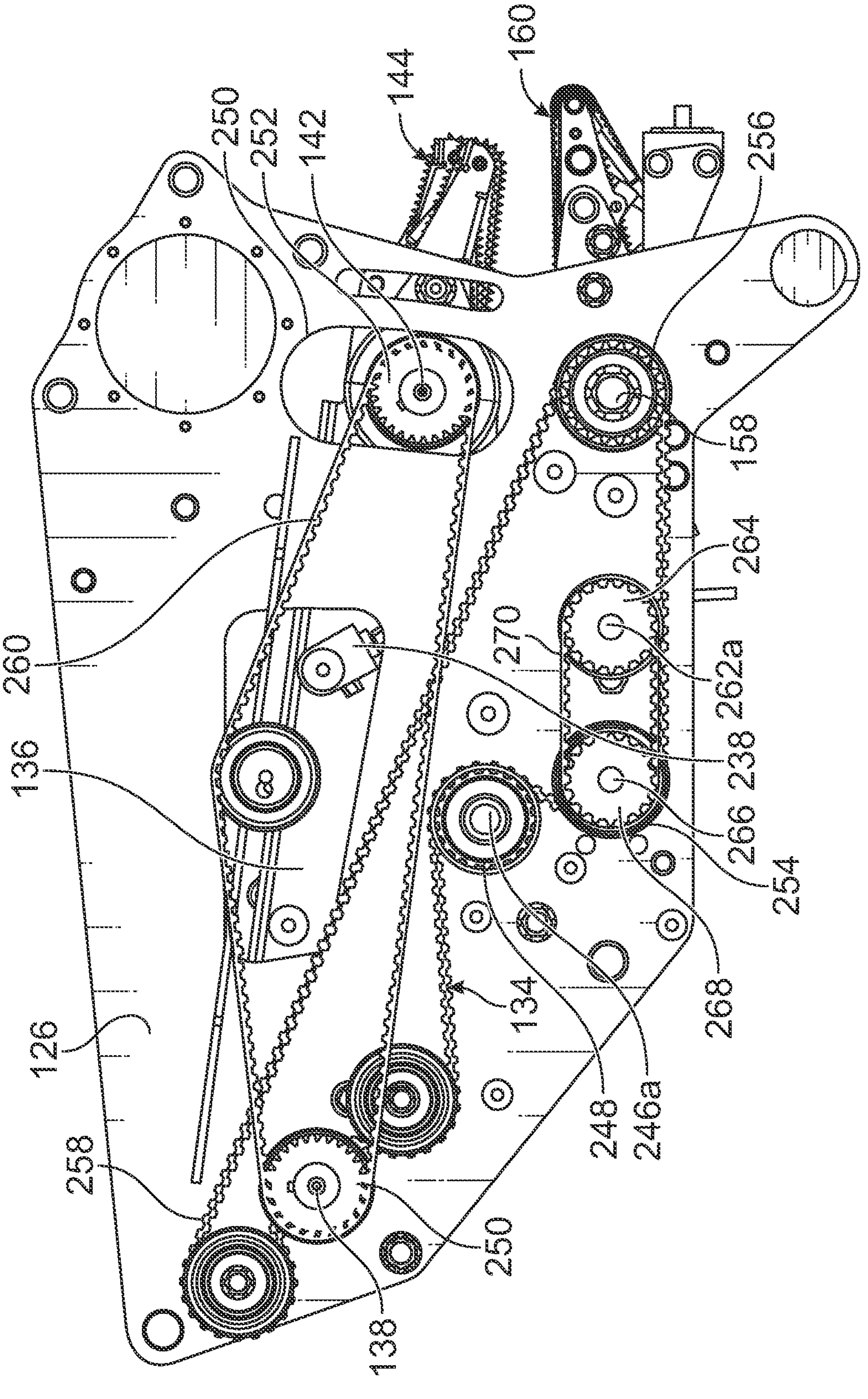

As best shown in FIGS. 8 and 9, the motor assembly 134 includes the support plate 244, a motor 246 having motor shaft 246*a* coupled to a toothed gear 248 on an end thereof. The toothed gear 248 is fixedly mounted on the motor shaft 246*a* for co-rotation therewith, and is rotatably mounted on the drive frame support plate 126. The motor 246 is mounted to a plate 247 which is coupled to the drive frame support plate 126 by struts 249. The motor assembly 134 further includes a toothed gear 250 fixedly mounted on the end of the rear shaft 138 for co-rotation therewith, a toothed gear 252 fixedly mounted on the end of the front shaft 142 for co-rotation therewith, a toothed gear 254 fixedly mounted on the end of the rear shaft 154 for co-rotation therewith, and a toothed gear 256 fixedly mounted on the end of the front shaft 158 for co-rotation therewith. The motor assembly 134 further includes belt 258 which engages with gears 248, 250, 254, 256, and belt 260 which engages with gears 250, 252. Other gears are provided on the drive frame support plate 126 for routing the belts 258, 260. As such, the conveyor assemblies 140, 144, 156, 160 are all driven by the common motor 246 and at the same speed. Since only a single motor 246 is used, the cost and complexity of the food product slicing apparatus 20 is reduced.

As shown in FIG. 5, the feed roller assembly 166 includes a feed roller 172 rotatably mounted between support plates 174 extending from the front conveyor assembly 160. The feed roller 172 is proximate to the front end of the front conveyor assembly 160. The feed roller 172 is coupled for rotation with the front shaft 158 by a belt 176. The feed roller 172 has a plurality of spaced apart rings 178 of spiked projections extending outwardly therefrom around the circumference of the feed roller 172. The axis of rotation of the feed roller 172 is transverse to a longitudinal axis of the front conveyor assembly 160.

Figure 7:
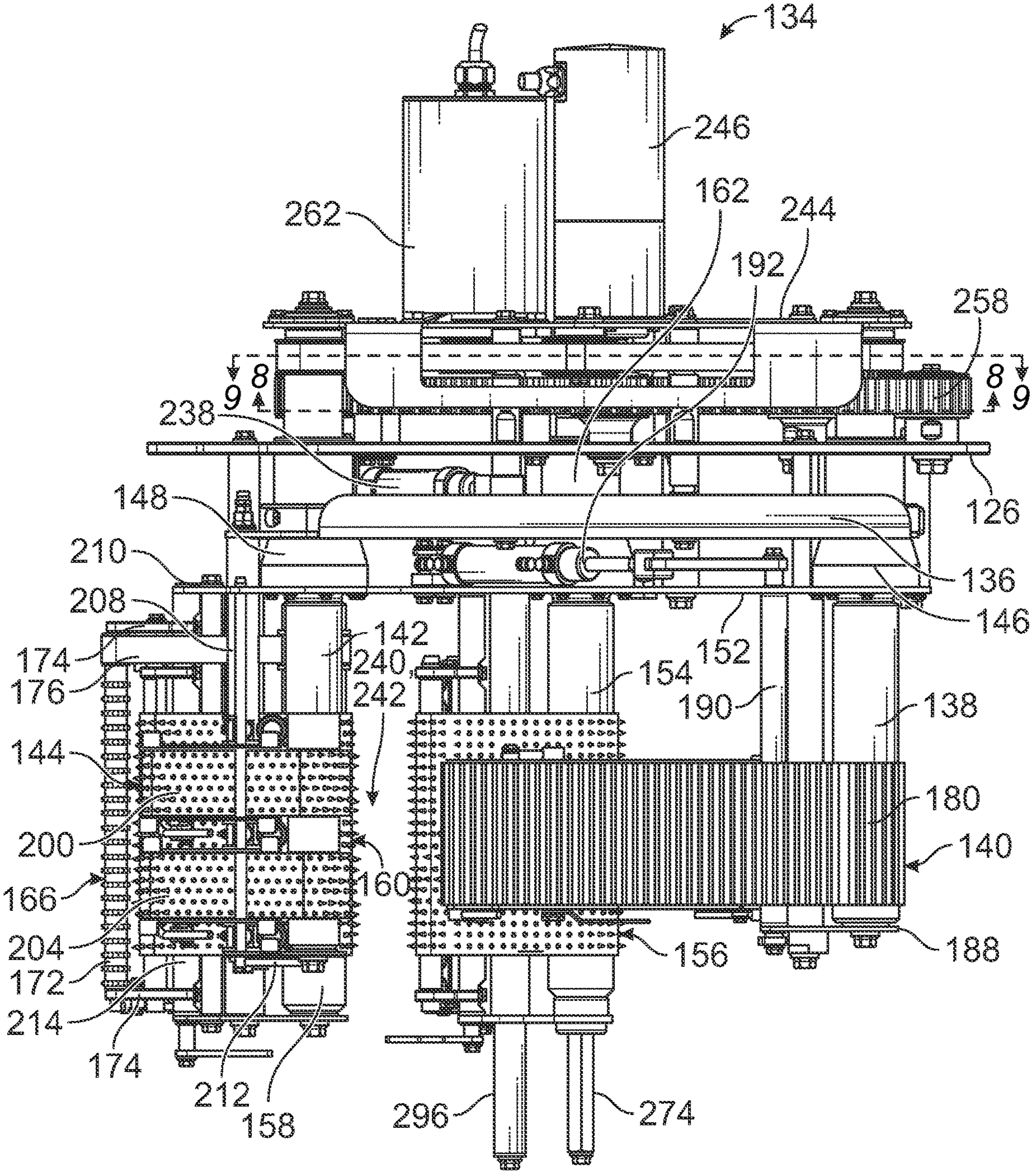
FIG. 7 depicts a top plan view of the drive assembly without the side strapping assembly.
Figure 11:
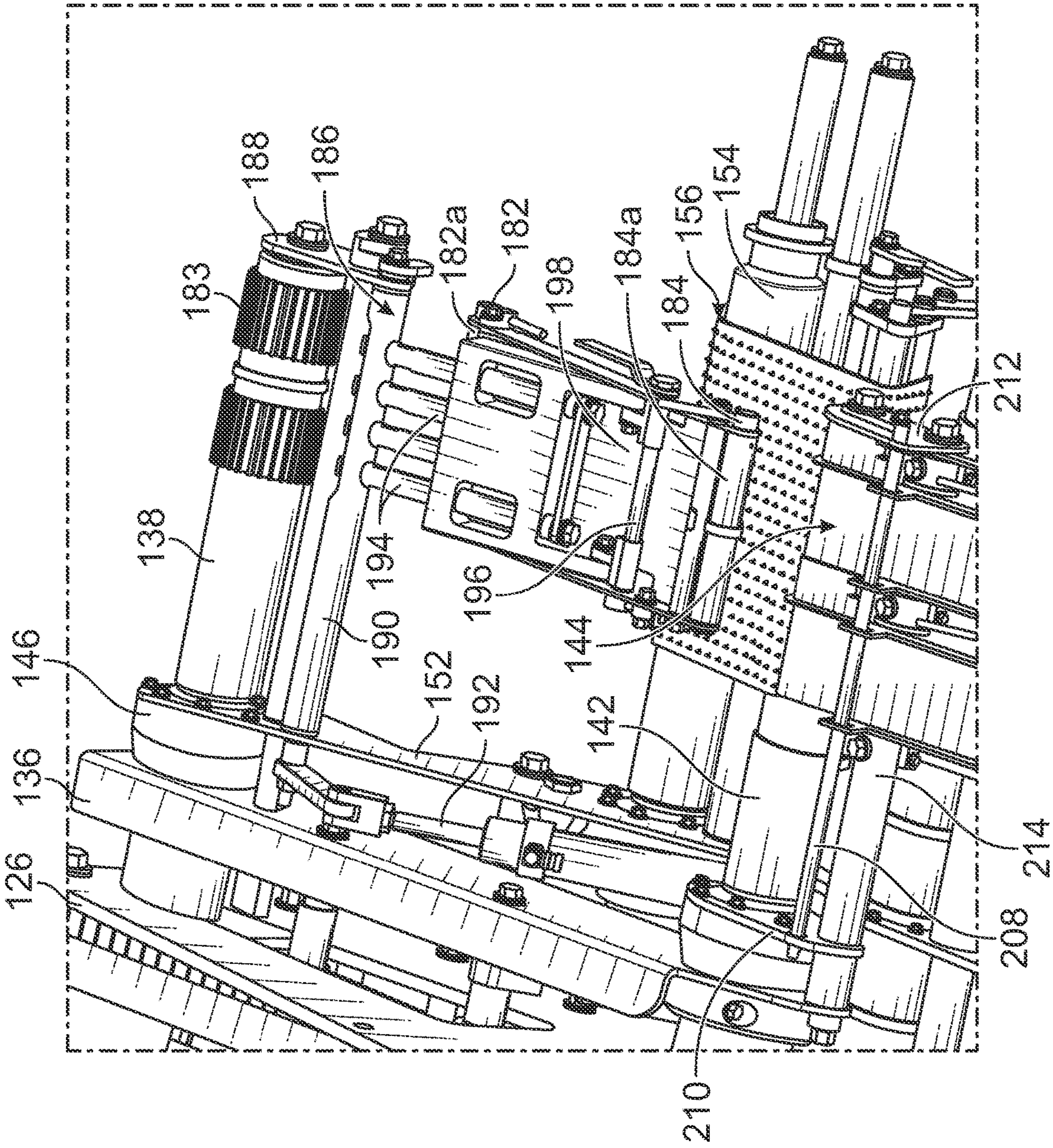
FIG. 11 depicts a front partial perspective view of the drive assembly with a belt of an upper rear conveyor assembly removed to show internal components.
Figure 12:
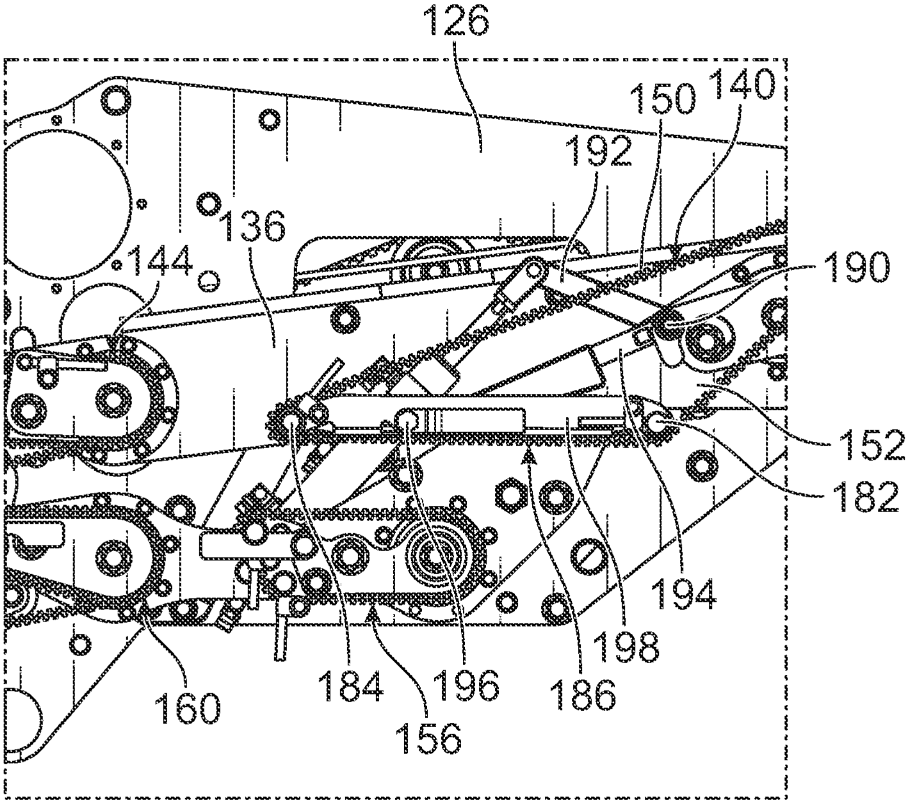
FIG. 12 depicts a partial cross-sectional view of the drive assembly showing an upper rear conveyor assembly in a neutral position.
Figure 13:
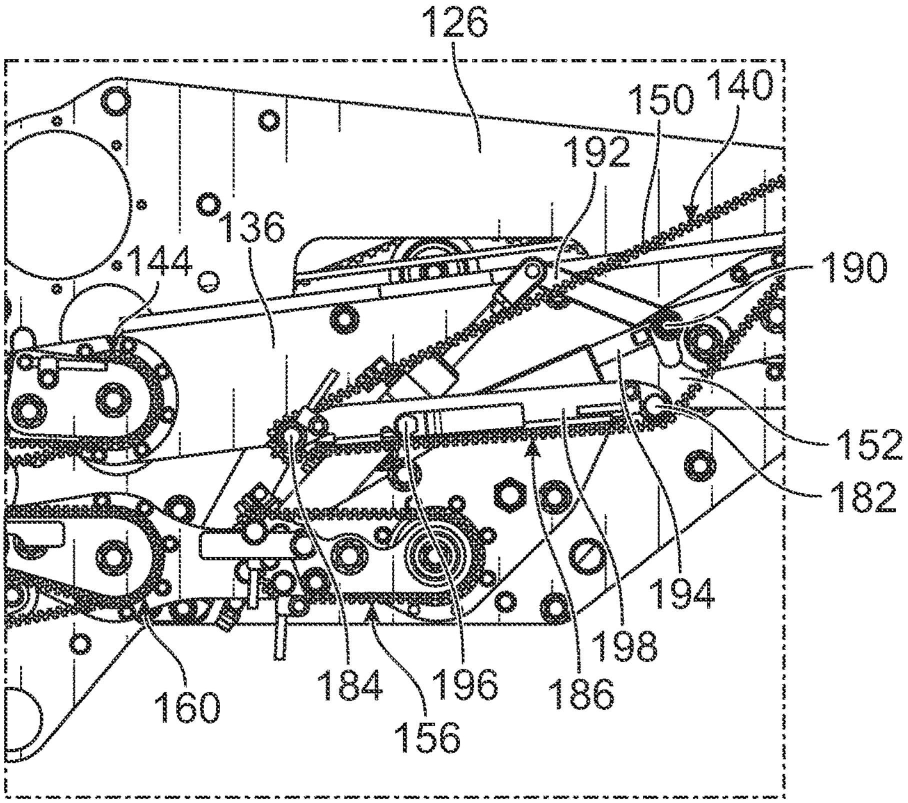
FIGS. 13 and 14 depict partial cross-sectional view of the drive assembly showing the upper rear conveyor assembly in pivoted positions.
Figure 14:
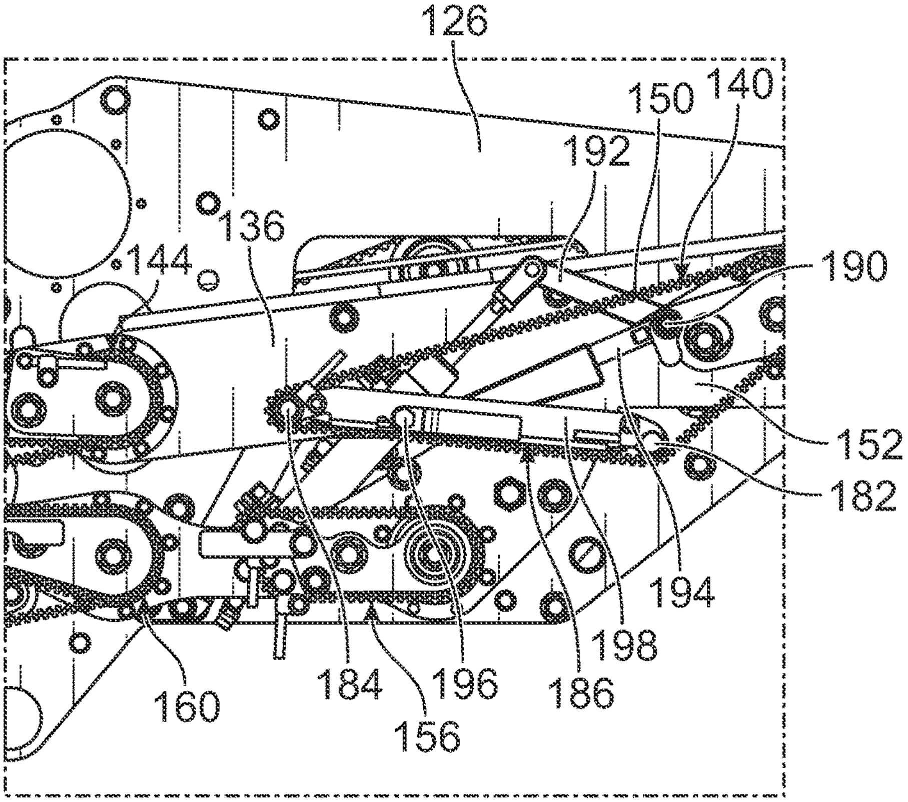

With reference to FIGS. 7 and 11, the endless belt 180 of the rear conveyor assembly 140 is wrapped around a toothed wheel 183 mounted on the rear shaft 138, and a pair of wheels 182*a*, 184*a* mounted on shafts 182, 184 which are on a lifting assembly 186. The lifting assembly 186 includes a support plate 188 at the end of the rear shaft 138, a shaft 190 extending between support plate 152 and support plate 188 and through the interior of the endless belt 180, an articulated actuator 192 having an rear end affixed to shaft 190 and a front end affixed to support plate 152, support bars 194 extending rear from the shaft 190 and within the interior of the endless belt 180, a shaft 196 pivotally coupled to front ends of the support bars 194, and a lifting plate 198 coupled to the shaft 196 and within the interior of the endless belt 180. The wheel 182*a* mounted on the shaft 182 is on the rear end of the lifting plate 198 and rearward of the shaft 196, and the wheel 184*a* mounted on the shaft 184 is on the front end of the lifting plate 198 and forward of the shaft 196. The lifting plate 198 has a longitudinal axis which extends between the wheels 182*a*, 184*a*. The shaft 196 defines the axis of rotation of the lifting plate 198 which is transverse to the longitudinal axis of the lifting plate 198. The lifting plate 198 and the wheels 182*a*, 184*a* mounted on shafts 182, 184 can pivot around shaft 196 to follow the contours of a top surface of the food product as shown in FIGS. 12-14 and pivots relative to the lower conveyor assembly 156. When the lifting plate 198 pivots relative to the lower conveyor assembly 156, the longitudinal axis of the lifting plate 198 becomes angled relative to the longitudinal axis of the lower conveyor assembly 156.

Figure 15:
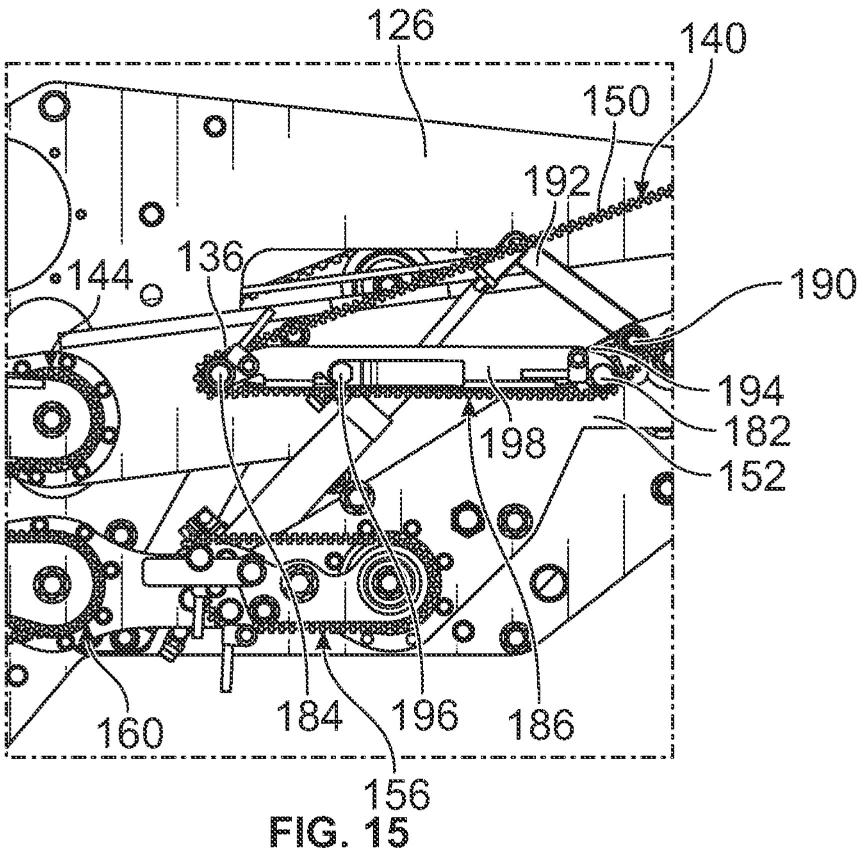
FIGS. 15 and 16 depict partial cross-sectional view of the drive assembly showing the upper rear conveyor assembly in raised and lowered positions.
Figure 16:
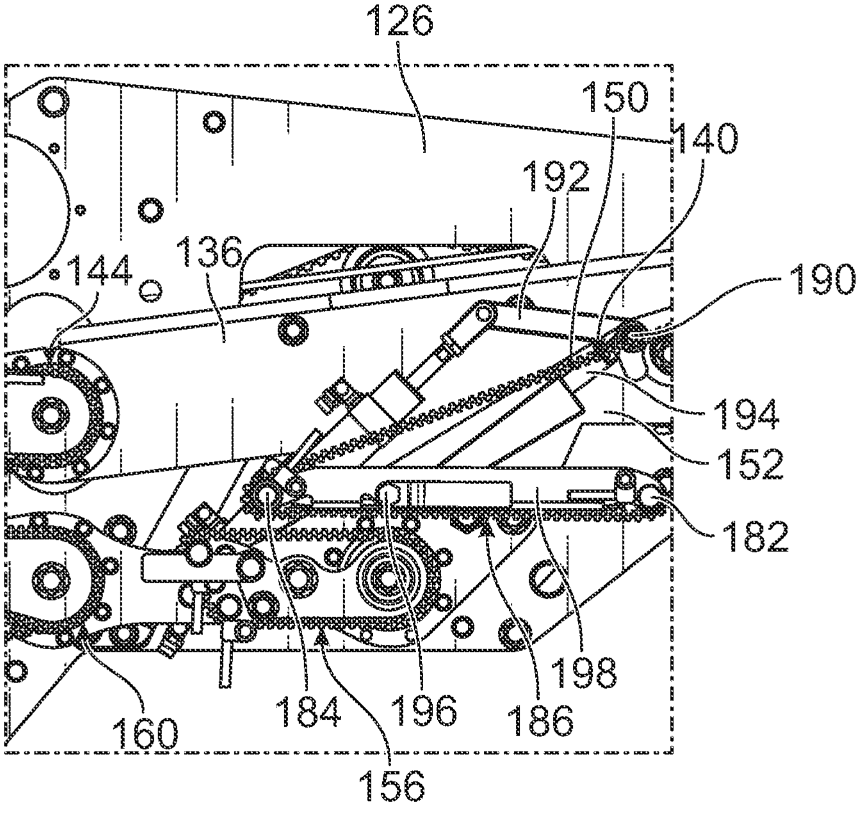

The entire lifting plate 198 and the front end of the endless belt 180 can move upwardly and downwardly relative to the rear conveyor assembly 156 as shown in FIGS. 12, 15 and 16. The articulated actuator 192 serves to bias the lifting plate 198 and the front end of the endless belt 180 downward toward the rear conveyor assembly 156. When a surface feature, such as a bump, on the food product causes the entire lifting plate 198 to move upward, the articulated actuator 192 is overcome by the shaft 196/lifting plate 198 moving generally vertically upward as shown in FIG. 15, and the shaft 190 and support bars 194 rotate. When the surface feature on the food product which caused the shaft 196/lifting plate 198 to move upward is no longer present, the articulated actuator 192 again biases the entire lifting plate 198 generally vertically downward as shown in FIG. 12. When a surface feature, such as a depression, on the food product causes the entire lifting plate 198 to move downward, the articulated actuator 192 continues to bias the entire lifting plate 198 generally vertically downward as shown in FIG. 16, and the shaft 190 and support bars 194 rotate.

As such, the lifting plate 198 and the front end of the endless belt 180 of the rear conveyor assembly 140 are capable of two movements relative to the drive frame support plate 126, the shaft 138 and the rear conveyor 156: 1) a pivoting movement relative to the rear conveyor assembly 156, and 2) an up and down movement relative to the upper plane defined by the rear conveyor assembly 156. Both movements can occur at the same time. The articulated actuator 192 may be a pneumatic cylinder.

With reference to FIGS. 5, 6, 17 and 18, the front conveyor assembly 144 of the upper drive assembly 130 includes a first endless belt 200 wrapped around a toothed wheel 142*a* mounted on the shaft 142 at a rear end of the first endless belt 200, a shaft mounted wheel 201 mounted on a shaft at a front end of the first endless belt 200, the wheel 201 being mounted on a first pivoting assembly 202, and second endless belt 204 wrapped around a toothed wheel 142*b* mounted on the shaft 142 at a rear end of the second endless belt 204, a shaft mounted wheel 203 at a front end of the second endless belt 204, the wheel 203 being mounted on a second pivoting assembly 206. A bar 208 extends from a support plate 210 which is affixed to the housing of bearing 148 to a support plate 212 at the end of the front shaft 142. The front shaft 142 is rotational relative to the support plates 210, 212. The bar 208 is coupled to the first and second pivoting assemblies 202, 206. A shaft 214 is provided between the support plate 210 and the support plate 212, and passes through the interior of each endless belt 200, 204. The shaft 214 is rotationally fixed to support plates 210, 212. Each endless belt 200, 204 defines a lower surface which engages with an upper surface of the food products. As shown in FIG. 5, the endless belts 200, 204 of the front conveyor assembly 144 have a combined width that is narrower than the endless belt 170 of the front conveyor assembly 160.

As best shown in FIGS. 17 and 18, the first pivoting assembly 202 includes a lifting plate 216 pivotally mounted on the shaft 214, and an actuator 218 affixed to the shaft 214. The lifting plate 216 has a pair of upright walls 220*a*, 220*b* extending from opposite sides of a base wall 220*c*. The endless belt 200 is between the upright walls 220*a*, 220*b* and the base wall 220*c* is within the interior of the endless belt 200. Each upright wall 220*a*, 220*b* has an elongated opening 222 at an upper end thereof through which the bar 208 extends. Each opening 222 is elongated from a rear end to a front end thereof. Each upright wall 220*a*, 220*b* further has a tab 224*a*, 224*b* extending outward therefrom. The tab 224*a* on the upright wall 220*a* is vertically above the actuator 218.

The second pivoting assembly 206 includes a lifting plate 226 pivotally mounted on the shaft 214, and an actuator 228 affixed to the shaft 214. The lifting plate 226 has a pair of upright walls 230*a*, 230*b* extending from opposite sides of a base wall 230*c*. The endless belt 204 is between the upright walls 230*a*, 230*b* and the base wall 230*c* is within the interior of the endless belt 204. Each upright wall 230*a*, 230*b* has an elongated opening 232 at an upper end thereof through which the bar 208 extends. Each opening 232 is elongated from a rear end to a front end thereof. Each upright wall 230*a*, 230*b* further has a tab 234*a*, 234*b* extending outward therefrom. The tab 234*b* on the upright wall 230*b* is vertically above the actuator 228.

An actuator 236 is affixed to the shaft 214 between the upright wall 220*b* of the first pivoting assembly 202 and the upright wall 230*a* of the second pivoting assembly 206. The tab 224*b* of the upright wall 220*b* is vertically above the actuator 236, and the tab 234*a* of the upright wall 230*a* is vertically above the actuator 236. The tabs 224*b*, 234*b* do not overlap. Accordingly, the actuator 236 can engage with either tab 224*b*, 234*b* or with both tabs 224*b*, 234*b*.

Figure 20:
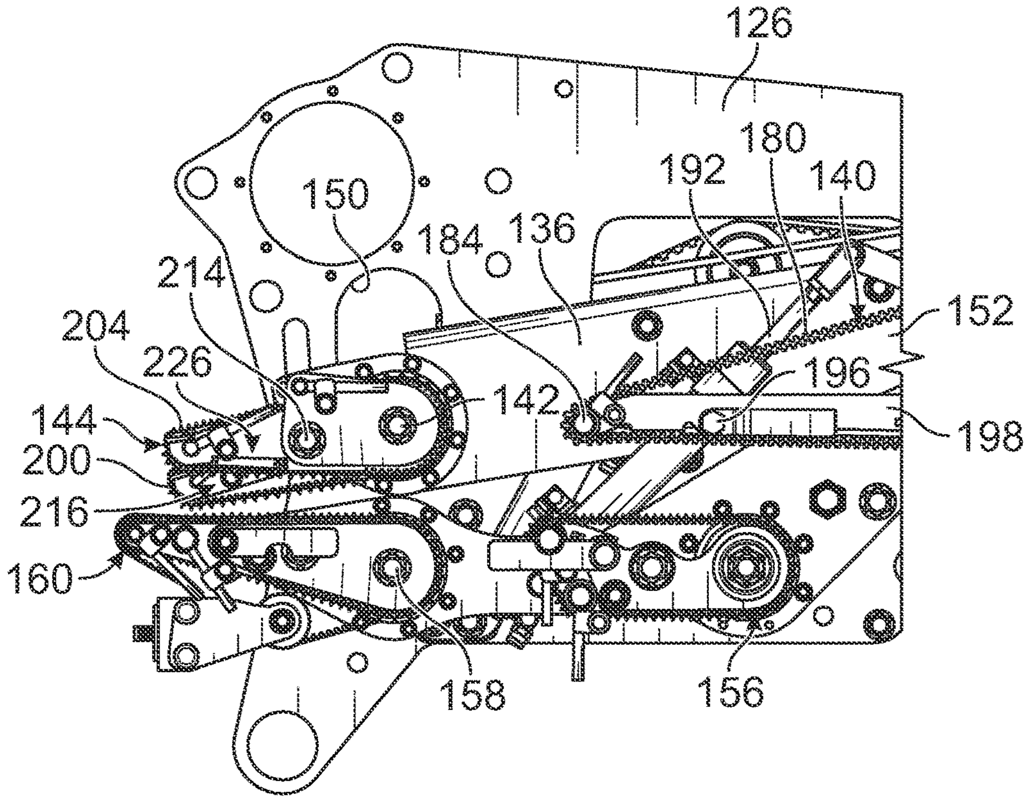

The actuators 218, 228, 236 are normally engaged with the tabs 224*a*, 234*b*, 224*b*, 234*a* to bias the front end of the lifting plates 216, 226 and the front wheel 201, 203 thereon downward toward the front conveyor assembly 160. As shown in FIGS. 19 and 20, when the front end of one of the endless belts 200, 204 engages a surface feature, such as a bump, on the top surface of the food product, the lifting plate 216, 226 pivots around shaft 214 and overcomes the bias from the appropriate actuator 218, 228, 236. Once the surface feature is passed, the actuator 218, 228, 236 pushes the appropriate tab 224*a*, 224*b*, 234*a*, 234*b* to bias the front end of the lifting plates 216, 226 and the front wheel thereon downward toward the front conveyor assembly 160. The enlarged openings 222, 232 allow the pivoting of the lifting plates 216, 226 relative to the shaft 214 while constraining the motion. The actuators 218, 228, 236 may be pneumatic cylinders.

Figure 21:
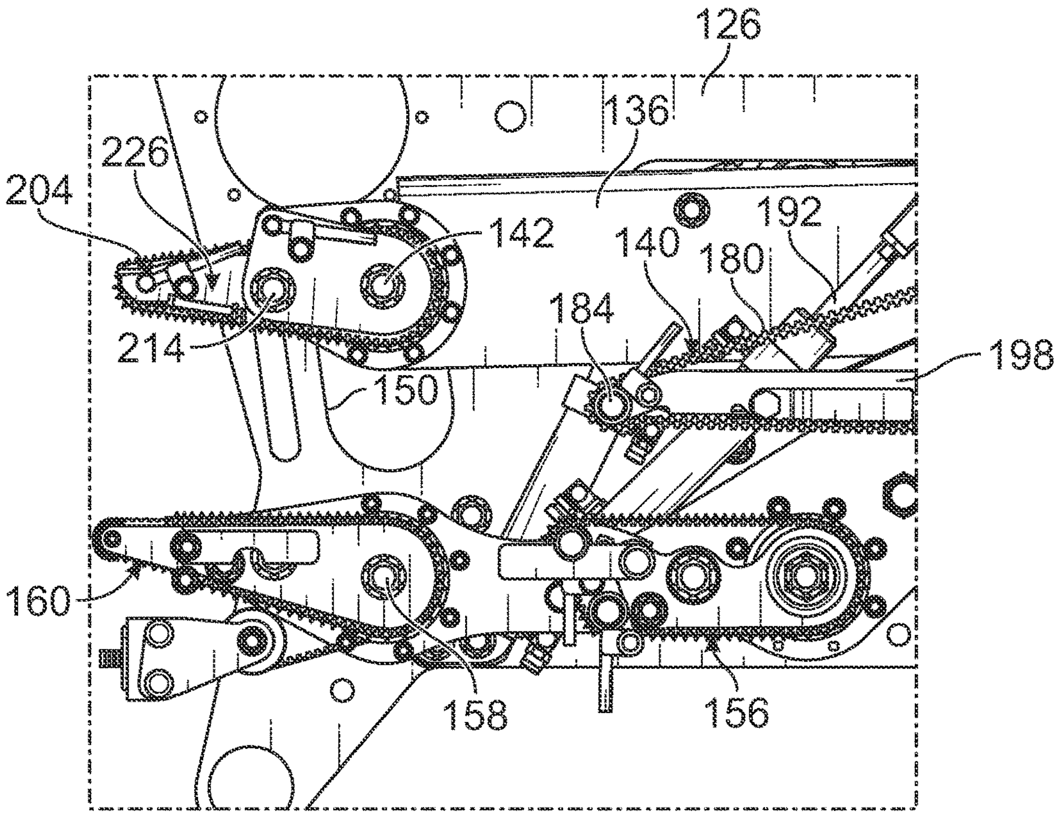
FIGS. 21 and 22 depict partial cross-sectional view of the drive assembly showing the upper front conveyor assembly in raised and lowered positions.
Figure 22:
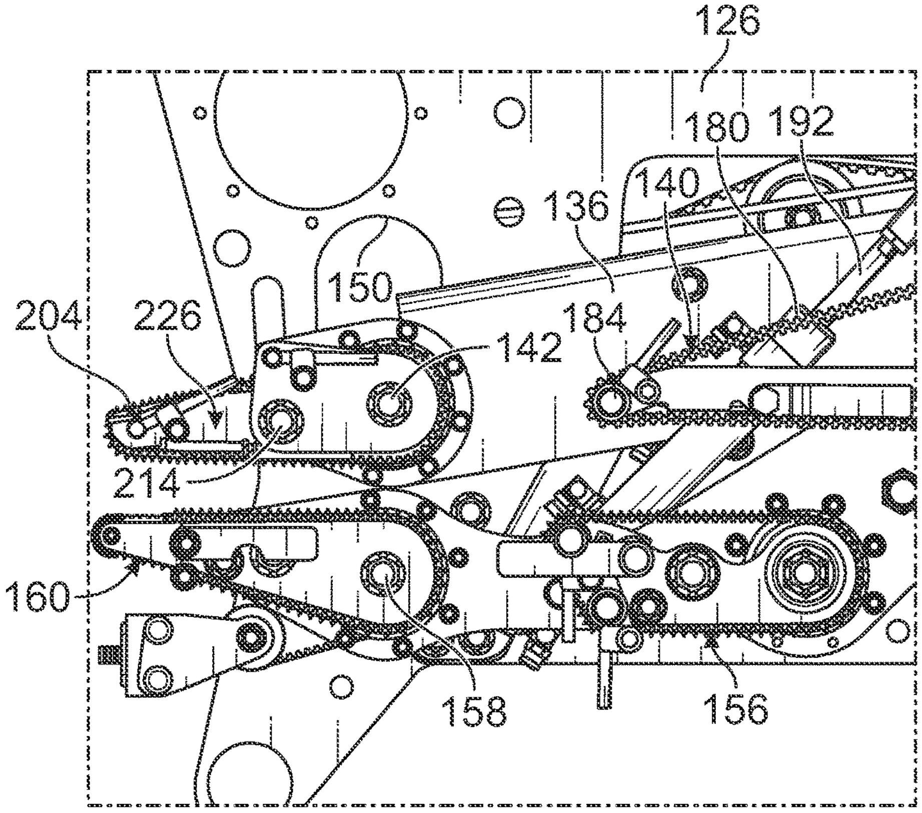
Figure 23:
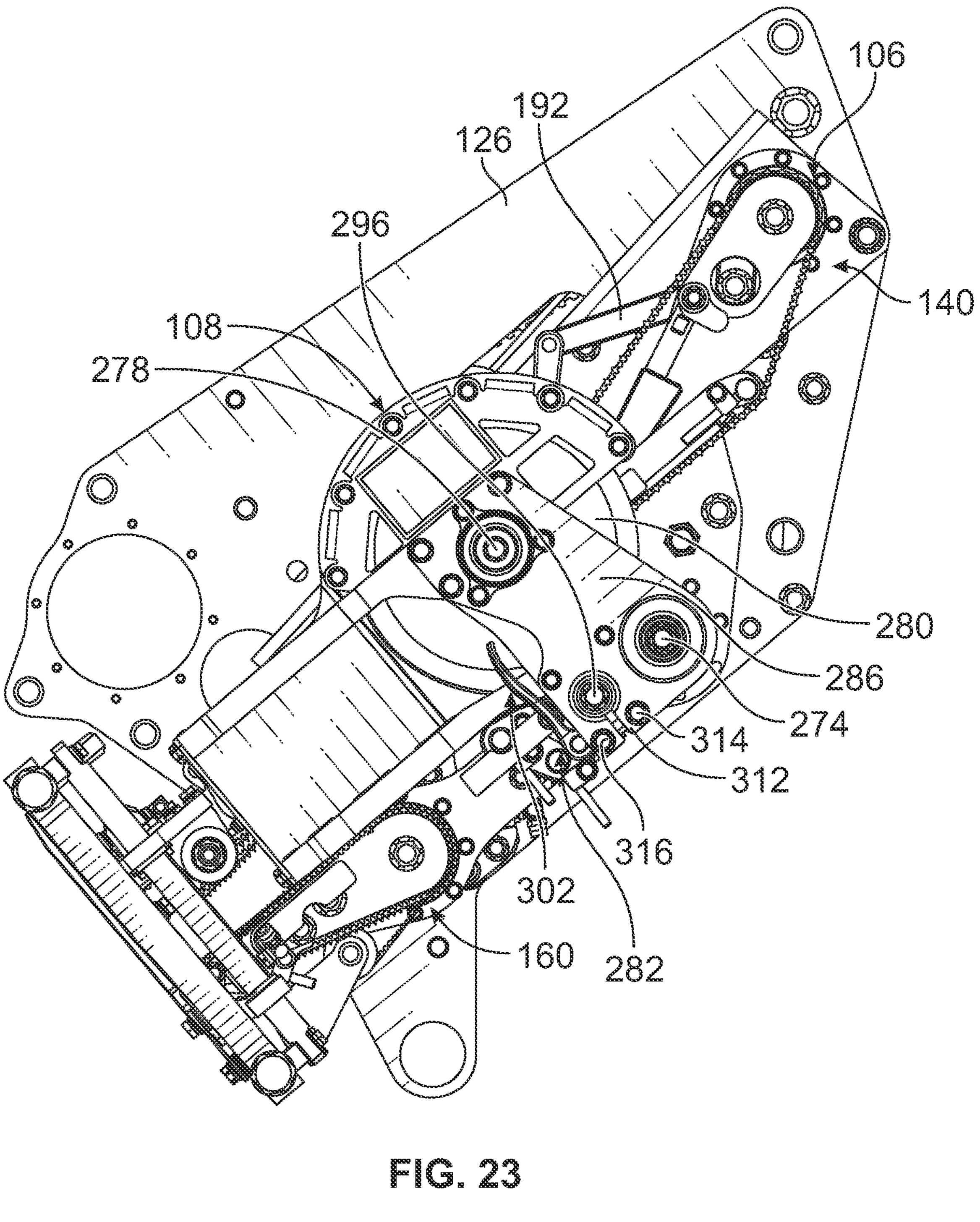
FIG. 23 depicts a side elevational view of the drive assembly and the side strapping assembly.

An actuator 238 is coupled between the drive frame support plate 126 and the support plate 136. Since the front conveyor assembly 144 is mounted to the drive frame support plate 126 and the support plate 136, the actuator 238 biases the front conveyor assembly 144 toward the front conveyor assembly 160. When a surface feature, such as a bump, on the food product causes the front conveyor assembly 144 to move upward away from the front conveyor assembly 144, the actuator 238 is overcome. The front shaft 142 moves in a pivoting arc within the enlarged opening 150 as shown in FIGS. 21 and 22. When the surface feature on the food product which caused the front conveyor assembly 144 to move upward is no longer present, the actuator 238 again biases front conveyor assembly 144 toward the front conveyor assembly 160. The actuator 238 may be a pneumatic cylinder.

As a result of the structure of the upper drive assembly 130, the front conveyor assembly 144 is capable of two movements relative to the drive frame support plate 126 and the lower drive assembly 132: 1) a pivoting movement by each belt 200, 204 relative to the front conveyor assembly 160, and 2) an up and down movement relative to the upper plane defined by the front conveyor assembly 160. Both movements can occur at the same time. Lifting plate 216 and wheel 201 are independently movable relative to lifting plate 226 and wheel 203 to follow the upper contour of the food product passing thereunder to provide optimal pressure on the food product as the food product is fed into the slicing assembly 28.

The rear conveyor assembly 140 of the upper drive assembly 130 is partially positioned over the rear conveyor assembly 156. The rear end of the rear conveyor assembly 140 is rearward of the rear end of the lower conveyor assembly 156 of the lower drive assembly 132. The front end of the rear conveyor assembly 140 is proximate to, but spaced from, the rear end of the front conveyor assembly 144 of the upper drive assembly 130 by the upper gap 240, and the front end of the rear conveyor assembly 156 of the lower drive assembly 132 is proximate to, but spaced from, the rear end of the front conveyor assembly 160 of the lower drive assembly 132 by the lower gap 242. and the front ends of the conveyor assemblies 140, 156 generally vertically align. As shown, the front end of the conveyor assembly 140 is rearward of the front end of the conveyor assembly 156, but they can vertically align. The front conveyor assembly 144 is positioned over the front conveyor assembly 160 and the rear ends and the front ends of the conveyor assemblies 144, 160 generally vertically align. The upper gap 240 is generally vertically above the lower gap 242.

When the loading tray assembly 104 is moved to the raised position, the front end of the conveyor 116 is underneath the rear conveyor assembly 140 and proximate to the rear end of the rear conveyor assembly 156.

The slicing assembly 28 includes a shear bar 340 mounted on the main frame 22 and a rotatable slicing blade 344 coupled to the main frame 22 for cutting the food products into slices. The shear bar 340 has an opening 350 through which the food product passes. The shear bar 340 may have a food product gripping assembly 342 as disclosed in U.S. Ser. No. 17/936,354 that works in conjunction with the feed roller 172 on the feed assembly 26 to firmly grip the food product as it passes into the slicing assembly 28. The shear bar 340 and the food product gripping assembly 342 are forward of the drive assembly 106 and the feed roller assembly 166. The slicing blade 344 is forward of the shear bar 340. The feed roller 172 and the food product gripping assembly 342 grip the food products as the food products are being sliced by the slicing blade 344. The slicing blade 344 is mounted on the frame 22 by a motor assembly (not shown) such that a lower end of the slicing blade 344 overlaps the portion of the opening through the shear bar 340.

In use, the food product is loaded on the load assembly 24 with the loading tray assembly 104 positioned in the lowered position. The conveyor 116 is activated to move the food product onto the loading tray assembly 104. Thereafter, the loading tray assembly 104 is moved to the raised position and the upper surface of the food product engages with the rear conveyor assembly 140. When the loading tray assembly 104 is moved to the raised position, the front end of the conveyor 116 is underneath the rear conveyor assembly 140 and proximate to the rear end of the rear conveyor 156. The rear conveyor assembly 140 and the conveyor 116 are activated to move the food product forward. The food product moves off of the conveyor 116 and onto the rear conveyor 156, while still being engaged by the rear conveyor assembly 140. The food product is transported between the conveyor assemblies 140, 156, over the gaps, and between the front conveyor assemblies 144, 160. When surface features on the food product are encountered by the rear conveyor assembly 140, the rear conveyor assembly 140 undergoes one or two of the movements relative rear conveyor assembly 156: 1) a pivoting movement relative to the rear conveyor assembly 156, and/or 2) an up and down movement relative to the upper plane defined by the rear conveyor assembly 156.

When surface features on the food product are encountered by the front conveyor assembly 144, the front conveyor assembly 144 undergoes one or two of the movements relative front conveyor assembly 160: 1) a pivoting movement by each belt 200, 204 relative to the front conveyor assembly 160, and/or 2) an up and down movement relative to the upper plane defined by the front conveyor assembly 160. This causes the food product to be firmly gripped during passage through the conveyor assemblies 140/156 and 144,160 and onto the feed roller 172 and through the shear bar 340. The rings 178 bite into the food product as the food product passes into the opening of the shear bar 340. The food product is sliced by the slicing blade 344 to cut the food product into individual slices. The individual slices fall onto the output assembly 30 for packaging.

Figure 24:
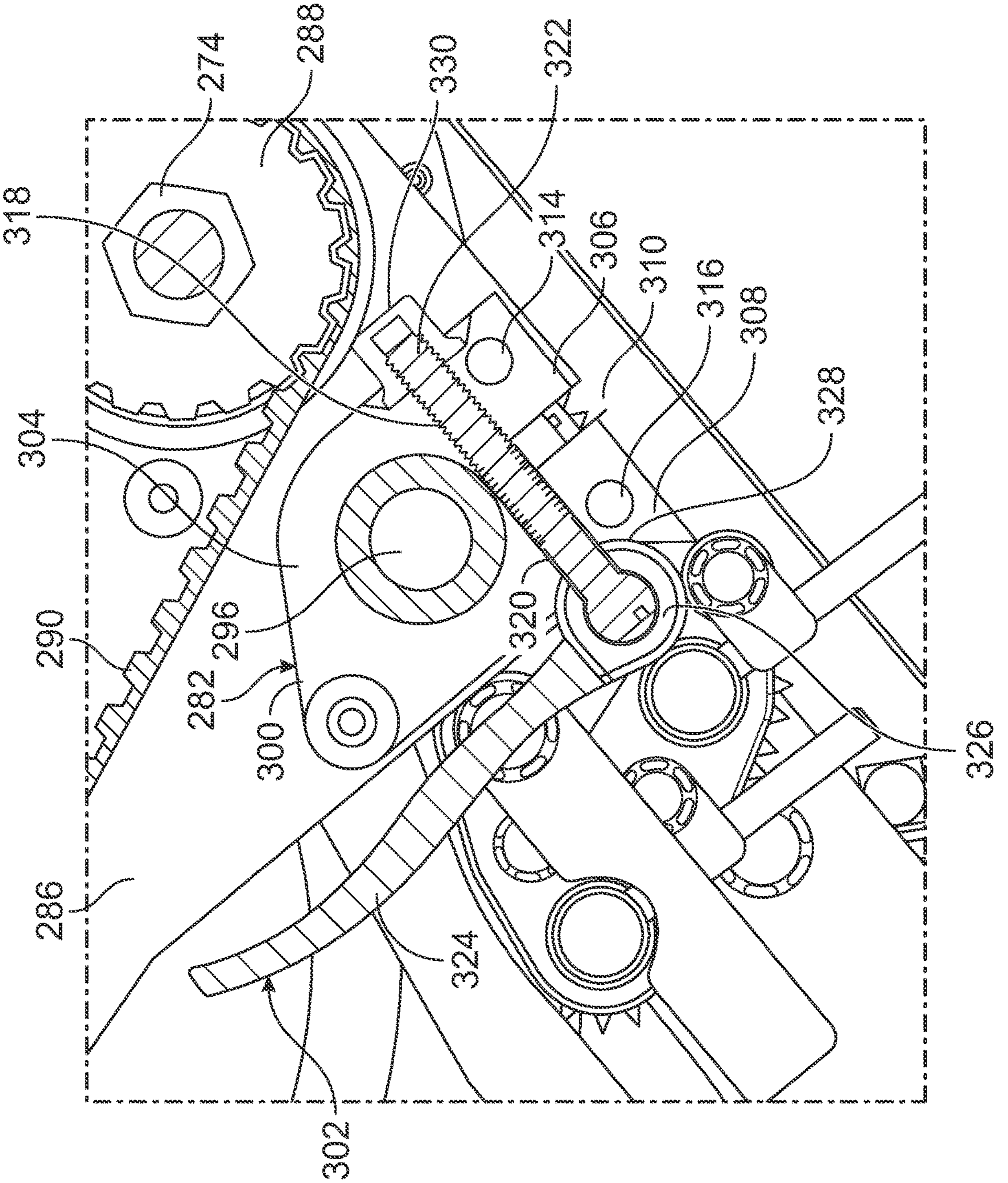
FIG. 24 depicts an enlarged cross-sectional views of portions of the drive assembly and the side strapping assembly.

In some embodiments and as shown, the feed assembly 26 includes a side strapping assembly 108 which side straps the food product along one side as it passes through the drive assembly 106 prior to entry into the slicing assembly 28. The side strapping assembly 108, see FIGS. 5, 24 and 25, is positioned proximate to the rear conveyor assembly 156 on a shaft 296 that extends from the drive frame support plate 126. The side strapping assembly 108 includes a motor 262 having a motor shaft 262*a* affixed to a gear 264 mounted on the drive frame support plate 126, a rotatable shaft 266 extending from the drive frame support plate 126, a gear 268 affixed to the end of the shaft 266, a belt 270 coupling the gears 264, 268 together for co-rotation, a blade driving assembly 276 releasably mounted on an outboard end 274 of the shaft 266, and having a side strapping blade 280 mounted on a driving shaft 278 which is coupled to the blade driving assembly 276, a plate 298 mounted on the outboard end of the shaft 266, and a clamp 282 mounted on a cylindrical portion of the shaft 296 for releasably coupling the blade driving assembly 276, the driving shaft 278 and the side strapping blade 280 to the shaft outboard end 274 and to the shaft 296. The shaft 296 passes through the rear conveyor 156 and through the blade driving assembly 276. In an embodiment, the shaft 266 extends through the shaft 154 and is rotatable relative to the shaft 154, and the shaft outboard end 274 extends outward from the shaft 154. The shaft 296 is parallel to the shafts 154, 266 and may be coupled thereto by a plate 298 having a bearing surrounding shaft 154. The plate 298 is affixed to the shaft 296. The shaft 296 and the plate 298 form a part of the main frame 22.

The shaft outboard end 274 has a non-circular profile, and may be hexagonal. The side strapping blade 280 is positioned to the outboard side of the rear conveyor assembly 156 opposite to the side on which the drive frame support plate 126 and the motor 262 are provided. The axis of rotation of the side strapping blade 280 provided by the driving shaft 278 is transverse to the longitudinal axis of the rear conveyor assembly 156, and the side strapping blade 280 is parallel to the longitudinal axis of the rear conveyor assembly 156.

The blade driving assembly 276 includes first and second plates 284, 286 which are spaced apart from each other. The shaft outboard end 274 extends through the plates 284, 286 and is coupled thereto by bearings 287. The blade driving assembly 276 further includes a toothed gear 288 affixed to the shaft outboard end 274 and which is positioned between the plates 284, 286. The toothed gear 288 is mounted for co-rotation with the shaft outboard end 274. The blade driving assembly 276 further includes a drive belt 290 looped around the toothed gear 288 and a toothed gear 292 affixed to the blade shaft 278. When the motor 262 is driven, the gear 264 on the motor shaft 262*a* drives the belt 270, which rotates the gear 268 and the shaft 266, which rotates the gear 288 and the drive belt 290, which rotates the gear 292, the blade shaft 278 and the side strapping blade 280. The side strapping blade 280 cuts a side portion of the food product with which the side strapping blade 280 engages. A chute 294 is mounted between the side strapping blade 280 and the plate 284 which collects the trim cut from the food product during the side strapping and provides a path for disposal of the trim.

The clamp 282 is coupled to the shaft 296. The clamp 282 includes a split ring 300 between the first and second plates 284, 286, and a handle 302 mounted to the split ring 300. The split ring 300 is mounted on a cylindrical portion of the shaft 296. The split ring 300 includes an encircling portion 304 that partially encircles the cylindrical portion of the shaft 296, a rear end portion 306, and a front end portion 308. The end portions 306, 308 are spaced apart from each other by a space 310. The space 310 is parallel to the axis of the shaft 296. Each plate 284, 286 has a split 312 which extends from the opening 313 through which the shaft 296 extends to a bottom end of the plate 284, 286. The splits 312 in the plates 284, 286 align with the space 310 between the end portions 306, 308 of the split ring 300. The end portions 306, 308 of the split ring 300 are coupled to each plate 284, 286 by fasteners 314, 316. The end portions 306, 308 have aligned passageways 318, 320 therethrough which are perpendicular to the axis of the shaft 296 and open into the space 310. Passageway 318 is threaded, and passageway 320 is unthreaded. The handle 302 includes a pivotable grip portion 324 and a fastener 322 extended therefrom. The fastener 322 has a rounded head engaged with rounded head 326 of the pivotable grip portion 324 and a threaded shaft extending therefrom. The shaft of the fastener 322 is threadedly engaged with the wall forming the passageway 318 of the rear end portion 306, and passes through the unthreaded passageway 320 in the front end portion 308. The rounded head 326 seats within a cam surface 328 of the front end portion 308. A nut 330 is coupled to the rear end of the threaded shaft of the fastener 322.

When the grip portion 324 is in the position as shown in FIGS. 24 and 25, the clamp 282 is unlocked from the shaft 296. When the grip portion 324 is pivoted, the rounded head 326 moves along the cam surface 328 and relative to the rounded head of the fastener 322, which pulls the shaft of the fastener 322 along the unthreaded passageway 320 and causes the end portions 306, 308 to move toward each other to reduce the widths of the splits 312 and the space 310, thereby locking the clamp 282 onto the cylindrical portion of the shaft 296. When the grip portion 324 is rotated to the draw the end portions 306, 308 toward each other, the side strapping assembly 108 cannot be released from the shaft outboard end 274 since the split ring 300 firmly engages with the cylindrical portion of the shaft 296. When the grip portion 324 is rotated in the opposite direction to that shown in FIGS. 24 and 25, the rounded head 326 again moves along the cam surface 328, which pushes the shaft of the fastener 322 along the unthreaded passageway 320 and causes the end portions 306, 308 to move away from each other to increase the widths of the splits 312 and the space 310, thereby unlocking the clamp 282 from the cylindrical portion of the shaft 296. The blade driving assembly 276 is slid along the outboard end 274 of the shaft 266, and the split ring 300 is slid along the cylindrical portion of the shaft 296, thereby sliding the blade driving assembly 276, the driving shaft 278, the side strapping blade 280 and the clamp 282 off of the shafts 266, 296. These components of the side strapping assembly 108 can be released from the shaft outboard end 274 since the split ring 300 does not firmly grip the shaft 296. As a result, these components of the side strapping assembly 108 can be easily engaged with, or released from, the shaft outboard end 274 and the shaft 296 without the use of tools. When these components of the side strapping assembly 108 are released from the shaft outboard end 274 and the shaft 296, the side strapping assembly 108 can be serviced, and maintenance can be performed on the conveyor assemblies 140, 144, 156, 160.

The distance the side strapping blade 280 is from the rear conveyor assembly 156 can be varied so as to vary the width of the side strapped food product by releasing the split ring 300 to increase the widths of the splits 312 and the space 310 and sliding the blade driving assembly 276, the driving shaft 278, the side strapping blade 280 and the clamp 282 along the lengths of the shafts 266, 296. After the desired position is reached, the split ring 300 is re-engaged to prevent the sliding movement of these components of the side strapping assembly 108 relative to the shaft outboard end 274 and the shaft 296.

While the side strapping assembly 108 is only shown and described as being on one side of the rear conveyor assembly 156, a second side strapping assembly 108 can be provided on the other side of the rear conveyor assembly 156 so that both sides of the food product can be side strapped.

Figure 4:
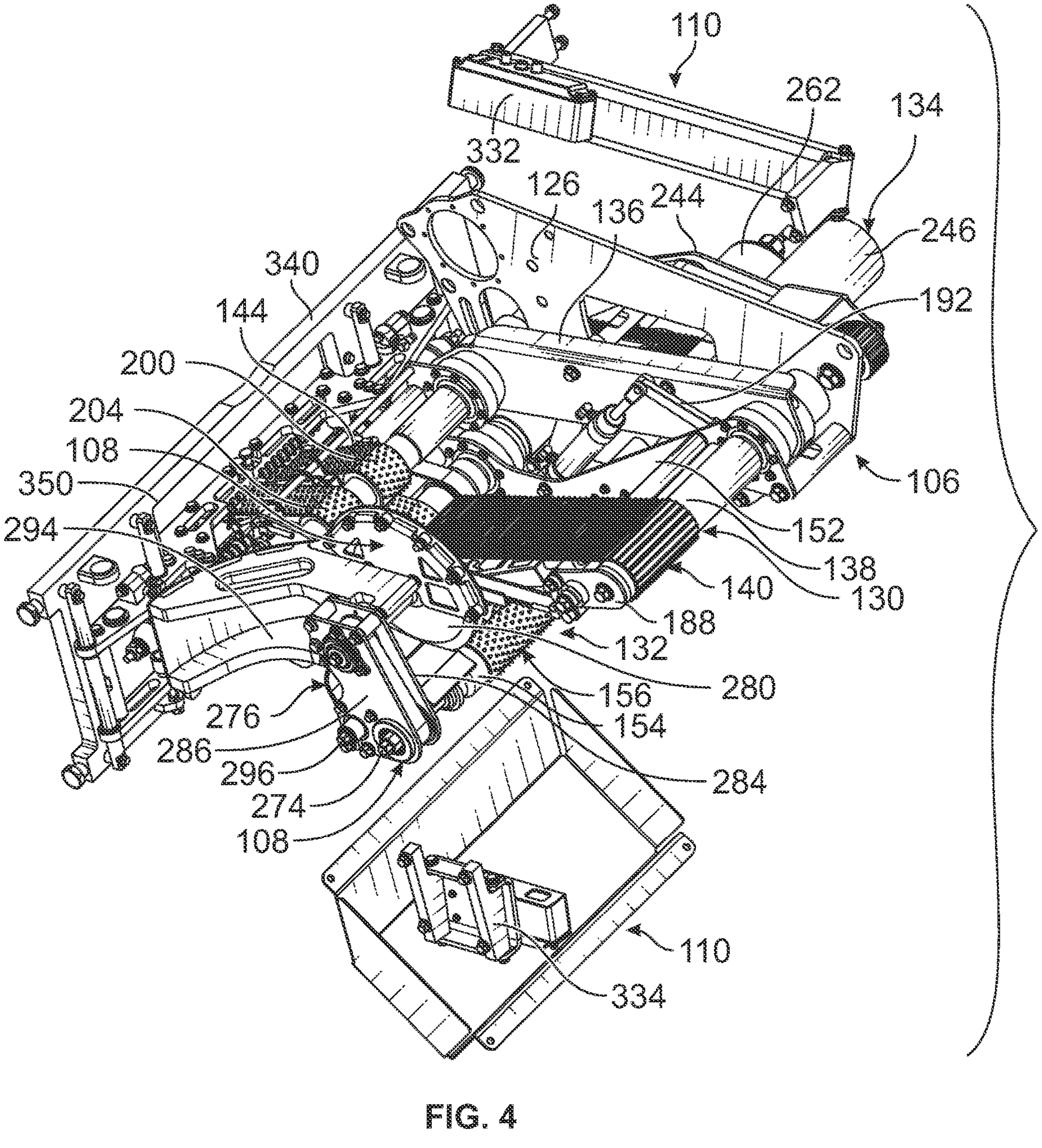
FIG. 4 depicts a rear perspective view of a drive assembly, a shear bar and a sensor system of the food product slicing apparatus.
Figure 10:
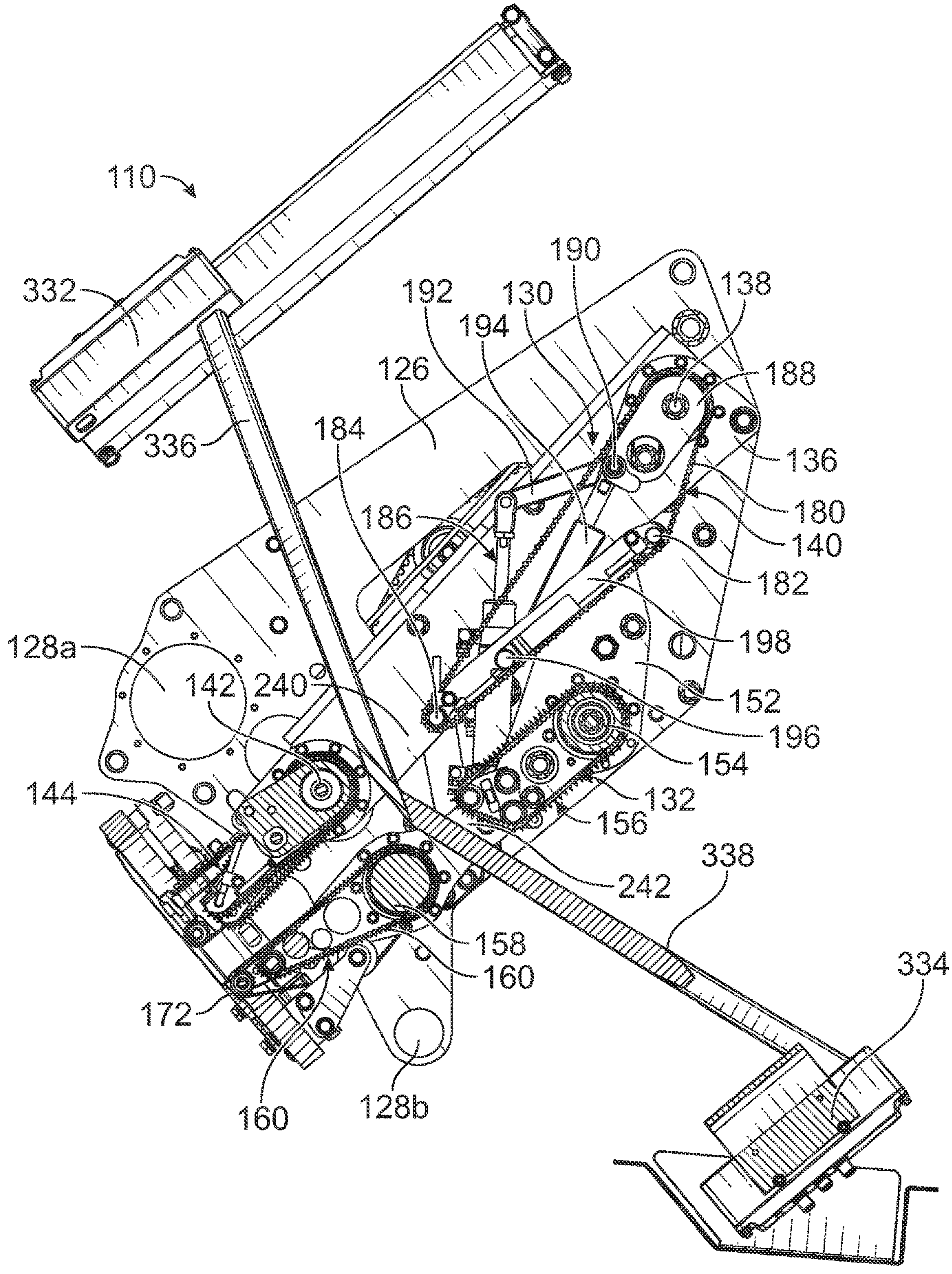
FIG. 10 depicts a cross-sectional view of the drive assembly and the sensor system.

In some embodiments, and as shown, the feed assembly 26 further includes a sensor system 110. As shown in FIGS. 4 and 10, the sensor system 110 includes an upper sensor 332 that is mounted on the main frame 22 above the upper drive assembly 130, and a lower sensor 334 that is mounted on the main frame 22 below the lower drive assembly 132. The upper sensor 332 has a field of view 336 that aligns with, and spans, the upper gap 240, and the lower sensor 334 has a field of view 338 that aligns with, and spans, the lower gap 242. The upper sensor 332 detects the profile of the upper surface of the food product and conveys this information to the control system 32, and the lower sensor 334 detects the profile of the upper surface of the food product and conveys this information to the control system 32. Appropriate sensors are provided to determine the distance the food product travels past the sensors 332, 334 and conveys this information to the control system 32. As a result, a three-dimensional shape of the food product is determined. The overall cross-section of the food product, combined with weight feedback downstream in the food product slicing apparatus 20 and assumed density of the food product, provides information to the control system 32 to determine what the overall slice thickness will need to be effected to provide for the overall slices sliced from a particular section of the food product will be the proper weight. This control system 32 determines the appropriate slice width for the desired weight and controls the speed that the common motor 246 activates the conveyor assemblies 140, 144, 156, 160. Since the sensors 332, 334 are mounted on the main frame 22, a minimum amount of space is used. The sensors 332, 334 may be one or more of one of an optical sensor, a laser, a camera, and an x-ray.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiment illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A drive assembly for a food product slicing apparatus which slices food products into slices, comprising:

a frame;

a lower conveyor assembly coupled to the frame; and an upper conveyor assembly including first and second shafts mounted on the frame, the first shaft being driven and rotatably mounted on the frame, a lifting plate coupled to the second shaft, a front wheel rotatably mounted on a front end of the lifting plate, and an endless belt surrounding the first shaft and the front wheel, wherein rotation of the first shaft causes movement of the endless belt around the first shaft and the front wheel, wherein the lifting plate and the front wheel are configured to move upward and downward relative to an upper plane defined by the lower conveyor assembly, and wherein the lifting plate is further configured to pivot about the second shaft and relative to the first shaft and the upper plane defined by the lower conveyor assembly to thereby pivot the front wheel toward or away from the lower conveyor assembly, and wherein the conveyor assemblies are configured to receive food products therebetween and to move the food products relative to the frame.

2. A food product slicing apparatus including the drive assembly of claim 1, further comprising a slicing blade rotatably coupled to the frame, wherein the slicing blade receives food product from the upper and lower conveyor assemblies.

3. The drive assembly of claim 1, further comprising a support bar coupling the lifting plate to the second shaft, wherein the lifting plate pivots relative to the support bar.

4. The drive assembly of claim 1, further comprising an actuator mounted on the frame and coupled to the second shaft, wherein the actuator is configured to rotate the second shaft to move the lifting plate upward and downward relative to the upper plane defined by the lower conveyor assembly.

5. A food product slicing apparatus including the drive assembly of claim 4, further comprising a slicing blade rotatably coupled to the frame, wherein the slicing blade receives food product from the conveyor assemblies.

6. The drive assembly of claim 1, wherein the upper and lower conveyor assemblies define a first upper conveyor assembly and a first lower conveyor assembly, the lifting plate defines a first lifting plate, the front wheel defines a first front wheel, and the endless belt defines a first endless belt, and further comprising a second lower conveyor assembly mounted on the frame, and a second upper conveyor assembly mounted on the frame, wherein the second conveyor assemblies are separated from the first conveyor assemblies by gaps and receive food product from the first upper and lower conveyor assemblies.

7. The drive assembly of claim 6, wherein the upper and lower conveyor assemblies are driven by a common motor.

8. The drive assembly of claim 6, wherein the second upper conveyor assembly includes third and fourth shafts mounted on the frame, the third shaft being driven and rotatably mounted on the frame, a second lifting plate pivotally coupled to the fourth shaft, a second front wheel rotatably mounted on a front end of the second lifting plate, and a second endless belt surrounding the third shaft and the second front wheel, wherein rotation of the third shaft causes movement of the second endless belt around the third shaft and the second front wheel, wherein the second lifting plate and second front wheel are configured to move upward and downward relative to an upper plane defined by the second lower conveyor assembly, and wherein the second lifting plate is further configured to pivot about the fourth shaft and relative to the third shaft and the upper plane defined by the second lower conveyor assembly to thereby pivot the second front wheel toward or away from the second lower conveyor assembly.

9. The drive assembly of claim 8, further comprising an actuator configured to move the second upper conveyor assembly upward and downward relative to the upper plane defined by the second lower conveyor assembly.

10. A food product slicing apparatus including the drive assembly of claim 9, further comprising a slicing blade rotatably coupled to the frame, wherein the slicing blade receives food product from the conveyor assemblies.

11. The drive assembly of claim 8, wherein the frame include a first plate and a second plate rotatably coupled together, the first and second shafts being mounted on the first plate and the third and fourth shafts being mounted on the second plate; and further comprising an actuator mounted on the frame and coupled to the second plate, wherein the actuator is configured to rotate the second plate to move the second upper conveyor assembly upward and downward relative to the upper plane defined by the second lower conveyor assembly.

12. A food product slicing apparatus including the drive assembly of claim 11, further comprising a slicing blade rotatably coupled to the frame, wherein the slicing blade receives food product from the conveyor assemblies.

13. A food product slicing apparatus including the drive assembly of claim 8, further comprising a slicing blade rotatably coupled to the frame, wherein the slicing blade receives food product from the conveyor assemblies.

14. The drive assembly of claim 8, wherein the second upper conveyor assembly further includes a third lifting plate pivotally coupled to the fourth shaft, a third front wheel rotatably mounted on a front end of the third lifting plate, and a third endless belt surrounding the third shaft and the third front wheel, wherein rotation of the third shaft causes movement of the second endless belt around the third shaft and the third front wheel, wherein the third lifting plate and third front wheel are configured to move upward and downward relative to the upper plane defined by the second lower conveyor assembly, and wherein the third lifting plate is further configured to pivot about the third shaft and relative to the upper plane defined by the second lower conveyor assembly to thereby pivot the third front wheel toward or away from the second lower conveyor assembly.

15. The drive assembly of claim 14, further comprising a second actuator configured to move the second upper conveyor assembly upward and downward relative to the upper plane defined by the second lower conveyor assembly.

16. A food product slicing apparatus including the drive assembly of claim 15, further comprising a slicing blade rotatably coupled to the frame, wherein the slicing blade receives food product from the conveyor assemblies.

17. The drive assembly of claim 15, wherein the frame include a first plate and a second plate rotatably coupled together, the first and second shafts being mounted on the first plate and the third and fourth shafts being mounted on the second plate; and further comprising an actuator mounted on the frame and coupled to the second plate, wherein the actuator is configured to rotate the second plate to move the second upper conveyor assembly upward and downward relative to the upper plane defined by the second lower conveyor assembly.

18. A food product slicing apparatus including the drive assembly of claim 17, further comprising a slicing blade rotatably coupled to the frame, wherein the slicing blade receives food product from the conveyor assemblies.

19. A food product slicing apparatus including the drive assembly of claim 14, further comprising a slicing blade rotatably coupled to the frame, wherein the slicing blade receives food product from the conveyor assemblies.

20. The drive assembly of claim 1, wherein the upper conveyor assembly further includes a second lifting plate pivotally coupled to the first shaft, a second front wheel rotatably mounted on a front end of the second lifting plate, and a second endless belt surrounding the first shaft and the second front wheel, wherein rotation of the first shaft causes movement of the second endless belt around the second shaft and the second front wheel, wherein the second lifting plate and second front wheel are configured to move upward and downward relative to the upper plane defined by the lower conveyor assembly, and wherein the second lifting plate is further configured to pivot about the second shaft and relative to the upper plane defined by the lower conveyor assembly to thereby pivot the second front wheel toward or away from the lower conveyor assembly.

21. A food product slicing apparatus including the drive assembly of claim 19, further comprising a slicing blade rotatably coupled to the frame, wherein the slicing blade receives food product from the conveyor assemblies.

22. The drive assembly of claim 8, further comprising a first actuator coupled to the second shaft and which is configured to rotate the second shaft to move the first lifting plate upward and downward relative to the upper plane defined by the first lower conveyor assembly, and a second actuator configured to move the second upper conveyor assembly upward and downward relative to the upper plane defined by the second lower conveyor assembly.

23. A food product slicing apparatus including the drive assembly of claim 22, further comprising a slicing blade rotatably coupled to the frame, wherein the slicing blade receives food product from the conveyor assemblies.

* * * * *